(12) United States Patent
Chen et al.

(10) Patent No.: US 12,047,466 B2
(45) Date of Patent: Jul. 23, 2024

(54) CONTENT PROCESSING METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Yuqing Chen, Shenzhen (CN); Junwen Cheng, Shenzhen (CN); Xin Shi, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/126,063

(22) Filed: Mar. 24, 2023

(65) Prior Publication Data

US 2023/0231930 A1 Jul. 20, 2023

Related U.S. Application Data

(63) Continuation of application No. PCT/CN2022/092917, filed on May 16, 2022.

(30) Foreign Application Priority Data

May 24, 2021 (CN) .......................... 202110582172.4

(51) Int. Cl.
*H04L 67/55* (2022.01)
*G06Q 30/0251* (2023.01)

(52) U.S. Cl.
CPC ......... *H04L 67/55* (2022.05); *G06Q 30/0251* (2013.01)

(58) Field of Classification Search
CPC ............................ H04L 67/55; G06Q 30/0271
See application file for complete search history.

(56) References Cited

U.S. PATENT DOCUMENTS 9,716,765 B2 * 7/2017 Li .......................... G06N 20/00
10,482,495 B2 * 11/2019 Li ...................... G06Q 30/0251
(Continued)

FOREIGN PATENT DOCUMENTS

| CN | 109684545 A | 4/2019 |
| CN | 111400603 A | 7/2020 |

(Continued)

OTHER PUBLICATIONS

The World Intellectual Property Organization (WIPO) International Search Report for PCT/CN2022/092917 dated Jul. 26, 2022 12 Pages (including translation).

*Primary Examiner* — Nazia Naoreen
(74) *Attorney, Agent, or Firm* — ANOVA LAW GROUP, PLLC

(57) ABSTRACT

A method includes: obtaining a push content request from an object; determining a push content set according to the push content request; detecting historical behavior feature data of the object for a push content in response to a behavior feature of the object for the push content satisfying a preset negative behavior condition; performing content-based matching for the push content set based on the historical behavior feature data to obtain a target push content set of the object; performing content sorting of the push content set and performing content-based matching of the push content of the object to obtain a target push content set of the object; and determining a target push content of the object from the target push content set, and transmitting the target push content to the object.

20 Claims, 9 Drawing Sheets

(56) References Cited

U.S. PATENT DOCUMENTS

| | | | |
|---|---|---|---|
| 11,412,070 B2* | 8/2022 | Fang | H04L 67/55 |
| 2021/0051122 A1* | 2/2021 | Bennah | G06F 16/433 |
| 2021/0092195 A1* | 3/2021 | Fan | H04L 51/046 |
| 2021/0209491 A1 | 7/2021 | Liu et al. | |

FOREIGN PATENT DOCUMENTS

| | | |
|---|---|---|
| CN | 111881352 A | 11/2020 |
| CN | 112084404 A | 12/2020 |
| JP | 2013206194 A | 10/2013 |

* cited by examiner

CONTENT PROCESSING METHOD AND APPARATUS, COMPUTER DEVICE, AND STORAGE MEDIUM

RELATED APPLICATIONS

This application is a continuation application of PCT Patent Application No. PCT/CN2022/092917 filed on May 16, 2022, which claims priority to Chinese Patent Application No. 202110582172.4, entitled "CONTENT PROCESSING METHOD AND APPARATUS, COMPUTER DEVICE, AND STORAGE MEDIUM" filed with the Chinese Patent Office on May 24, 2021, all of which are incorporated by reference in entirety.

FIELD OF THE TECHNOLOGY

The present disclosure relates to the field of computer technologies, and specially to a content processing method and apparatus, a computing device, and a storage medium.

BACKGROUND

Promotion may be used to expand the scope of influence of things, and includes marketing, publicizing, advertising, etc. A push content may be a content to be promoted. For example, the push content may include a text content, an image content, a video content, an audio content, a link content, etc.

In the process of research and practice of related technologies, it has been found that a content is pushed to objects, because some objects have a negative content interaction behavior with respect to the push content, existing methods for processing the push content have a lower push accuracy and efficiency for these objects. Therefore, it is desirable to improve the methods for processing the push content.

SUMMARY

Embodiments of the present disclosure provides a content processing method and apparatus, computing device, and storage medium, to improve the processing of efficiency a push content for a target object.

An embodiment of the present disclosure provides a content processing method, executed by a computing device, the method including:
  obtaining a push content request from an object;
  determining a push content set according to the push content request, the push content set including at least one push content;
  detecting historical behavior feature data of the object for a push content in response to a behavior feature of the object for the push content satisfying a preset negative behavior condition;
  performing content-based matching for the push content set based on the historical behavior feature data to obtain a target push content set of the object, in response to the object having the historical behavior feature data;
  performing content sorting of the push content set and performing content-based matching of the push content of the object to obtain a target push content set of the object, in response to the object not having the historical behavior feature data; and
  determining a target push content of the object from the target push content set, and transmitting the target push content to the object.

An embodiment of the present disclosure further provides a content processing apparatus, including: a memory storing computer program instructions; and a processor coupled to the memory and configured to execute the computer program instructions and perform:
  obtaining a push content request from an object;
  determining a push content set according to the push content request, the push content set including at least one push content;
  detecting historical behavior feature data of the object for a push content in response to a behavior feature of the object for the push content satisfying a preset negative behavior condition;
  performing content-based matching for the push content set based on the historical behavior feature data to obtain a target push content set of the object, in response to the object having the historical behavior feature data;
  performing content sorting of the push content set and performing content-based matching of the push content of the object to obtain a target push content set of the object, in response to the object not having the historical behavior feature data; and
  determining a target push content of the object from the target push content set, and transmitting the target push content to the object.

An embodiment of the present disclosure further provides a storage medium, storing a computer program. When the computer program is executed by a processor, the operations of the content processing method in the embodiments of the present disclosure are implemented.

An embodiment of the present disclosure further provides a computing device, including a memory, a processor, and a computer program stored in the memory and executable by the processor, the computer program, when executed by the processor, implementing the operations of the content processing method in the embodiments of the present disclosure.

An embodiment of the present disclosure further provides a computer program product or a computer program, including computer instructions, the computer instructions being stored in a computer-readable storage medium. A processor of a computing device reads the computer instructions from the computer-readable storage medium, and executes the computer instructions, so that when executing the computer program, the computing device implements the operations of the content processing method in the embodiments of the present disclosure.

In certain embodiment(s), an object whose behavior feature for a push content meets the preset negative behavior condition may be determined as a target object, and after obtaining a push content request from the target object, it is determined how to perform content-based matching of the push content of the target object from the push content set based on whether the target object has historical behavior feature data for the push content, so as to achieve content pushing for the target object with enhanced accuracy. In certain embodiment(s), if the target object has the historical behavior feature data for the push content, content-based matching may be performed based on the historical behavior feature data in this solution. In this way, the push content of interest to the target object may be more accurately selected by referring to the content interaction history of the target object for the push content. If the target object does not have the historical behavior feature data for the push content, the corresponding push content may be determined from the push content set through sorting and searching in this solution, to increase the probability of selecting the push content of interest to the target object. Therefore, this solution may improve the efficiency of processing the push content when implementing content pushing to the target object, thereby improving the push accuracy and efficiency of content pushing to the target object.

Other aspects of the present disclosure may be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and may be combined with each other without conflict.

In certain embodiments, the term "based on" is employed herein interchangeably with the term "according to."

Embodiments of the present disclosure provide a content processing method and apparatus, computing device, and storage medium. In certain embodiment(s), an embodiment of the present disclosure provides a content processing apparatus applicable to a computing device. The computing device may be a terminal, a server, etc. The terminal may be a mobile phone, a tablet computer, a notebook computer, or the like. The server may be one server, or may be a server cluster including a plurality of servers.

The embodiments of the present disclosure will introduce the content processing method using an example where the content processing method is jointly executed by a server and a terminal.

Figure 1:
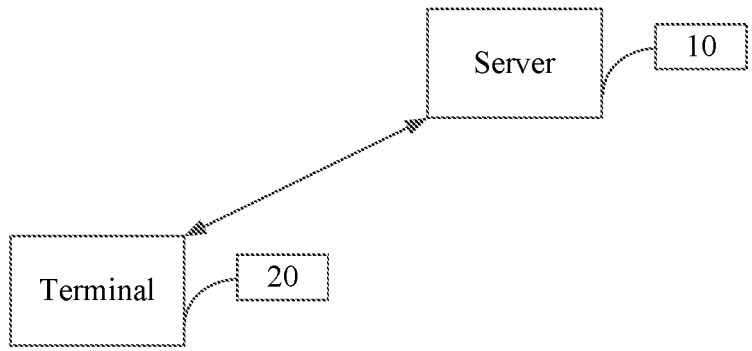
FIG. 1 is a schematic diagram of a scenario of a push content processing method according to certain embodiment(s) of the present disclosure.

Referring to a schematic diagram of a scenario of a push content processing method shown in FIG. 1, an object may send a push content request to a server 10 through a terminal 20. Correspondingly, the server 10 may obtain the push content request from the object and determine a push content set according to the push content request. The push content set may include at least one push content. The server 10 may detect historical behavior feature data of the object for a push content in response to a behavior feature of the object for the push content satisfying a preset negative behavior condition, determines whether the preset negative behavior condition of the object exists, and performs content-based matching to obtain a target push content set of the object.

In certain embodiment(s), the server 10 may perform content-based matching for the push content set based on the historical behavior feature data to obtain a target push content set of the object, in response to the object having the historical behavior feature data. The server 10 may perform content sorting of the push content set and determine the push content of the object to obtain a target push content set of the object, in response to the object not having the historical behavior feature data.

Further, the server 10 may determine a target push content of the object from the target push content set, and transmit the target push content to the object. For example, the server 10 may transmit the target push content to the terminal 20, so that the object may obtain the target push content through the terminal 20.

The following describes the embodiments of the present disclosure in detail. The order in which the following embodiments are described is not intended to limit the superiority of the embodiments.

An embodiment of the present disclosure provides a push content processing method. The method may be executed by a terminal or a server, or jointly by a terminal and a server.

Figure 2:
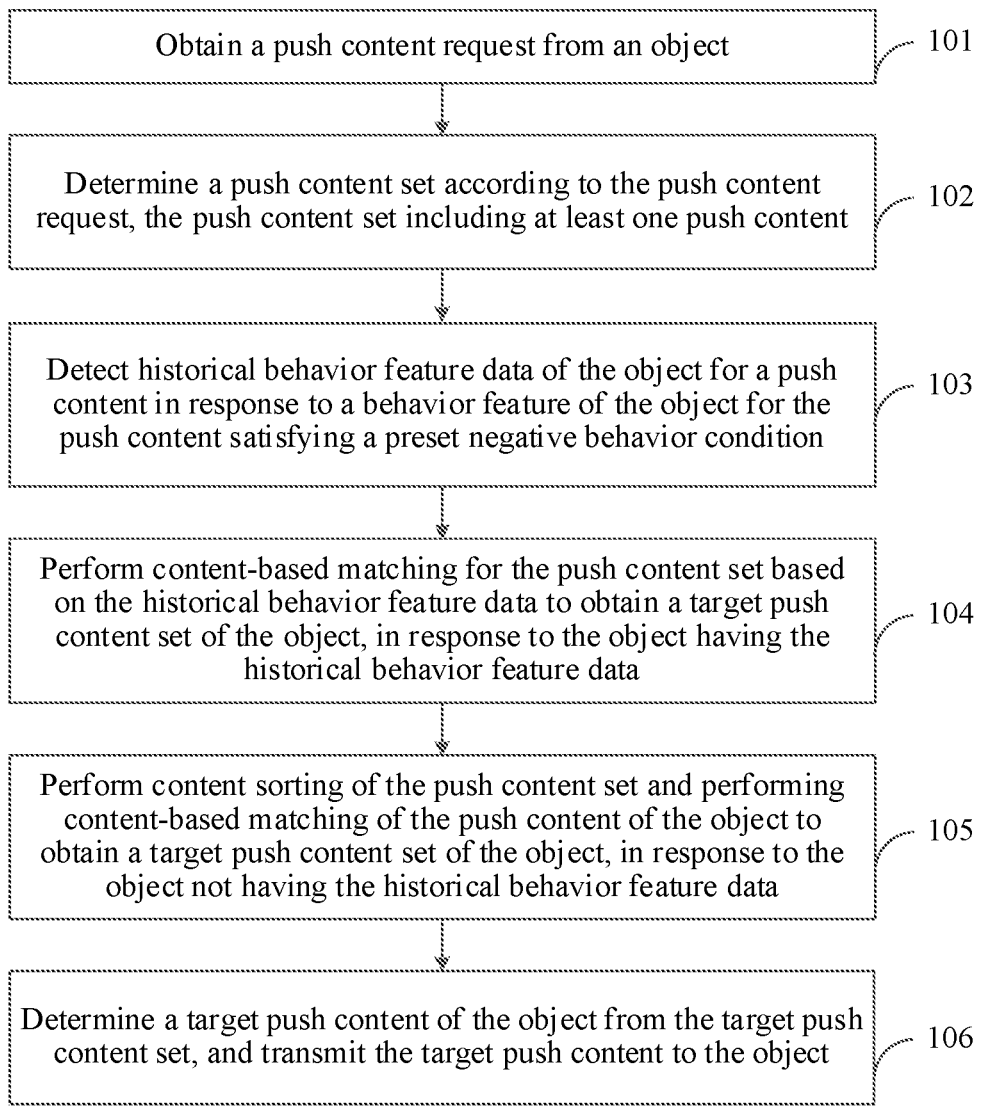
FIG. 2 is a schematic flowchart of a push content processing method according to certain embodiment(s) of the present disclosure.

The embodiments of the present disclosure are described using an example where the push content processing method is executed by a server, by a push content processing apparatus in the server. As shown in FIG. 2, the process of the push content processing method may include the following operations 101-106:

101. Obtain a push content request from an object.

Promotion may be used to expand the scope of influence of things, and includes marketing, publicizing, advertising, etc.

A push content may be a content to be promoted. For example, the push content may include various different forms of data, that is, the push content may exist in many forms, and may be, for example, a text content, an image content, a video content, an audio content, a link content, etc. In addition, several contents may be combined to obtain a combined push content, so that the obtained push content may include several different forms of data. For example, taking advertising as an example, an advertising content may include an advertising description text, an image, a video, an audio, interactive settings, and so on.

In the example of advertising, the push content may be a news feed advertisement. The news feed advertisement is an advertisement located in moments of a friend of a social media user or in an information media or audiovisual media content stream. News feed advertisements may be in forms of pictures, pictures and texts, videos, etc., and are characterized by algorithm recommendation and native experience. News feed advertisements may be placed in a targeted manner based on tags, and a user selects push exposure, a landing page, application download, etc. according to a requirement. Implementation scenarios of news feed advertisements may include news, social networking, video, search and other media.

As an example, news media may include news applications. For news media, an advertising content may be added between information and information without affecting the user's experience in the media. Social media may include social applications. For social media, an advertising content may be added between user state information streams, and the user may like, forward and comment on the advertisement. Video media may include video applications. For video media, an advertisement may be inserted between videos. The user may see the advertisement when looking for a video. Search media may include search applications. For search media, news feed advertisements rely on a search engine. After a user searches a keyword through the search engine, several related advertising recommendation links are automatically obtained through matching match in the search results.

In an embodiment, the object is an entity using an application or a service. For example, the object may include a user of the application or service, such as an individual user, an organization, etc.

In an embodiment, the push content request is a request to obtain the relevant information data of the push content. For example, the object may send the push content request to the server through the terminal. The server may transmit a corresponding push content to the terminal in response to the push content request, to realize the content pushing to the object.

As an example, the push content may be an advertisement such as a news feed advertisement, the object is a user as an example. In certain embodiment(s), the server may obtain the user's advertisement request and transmit the corresponding advertisement to the user in response to the advertisement request.

The server may obtain the push content request from the object in various manners, for example, through a terminal. For another example, the push content request may be obtained through another server, and so on.

102. Determine a push content set according to the push content request, the push content set including at least one push content.

In one embodiment, the push content set is a set including at least one push content. For example, if push contents are advertisements, the push content set may be an advertisement set, which may include at least one advertisement.

As an example, the push content set may include a historical push content set and a to-be-pushed content set.

In certain embodiment(s), a to-be-pushed content is a push content to be pushed to the object. For example, the to-be-pushed content may be an advertisement to be pushed to the user. Correspondingly, the to-be-pushed content set is a set composed of to-be-pushed contents, and may include at least one to-be-pushed content. For example, the to-be-pushed content set may be a to-be-pushed advertisement set, which may include at least one advertisement to be pushed.

In certain embodiment(s), the terms "to-be-pushed content," "to-be-pushed content set," "to-be-pushed contents," and "to-be-pushed advertisement set," may respectively be referred to as "content," "content set," "contents," and "advertisement set."

A historical push content is a push content that has been pushed to the object. For example, the historical push content may be an advertisement that has been pushed to the user. Correspondingly, the historical push content set is a set composed of historical push contents, and may include at least one historical push content. For example, the historical push content set may be a historical push advertisement set, which may include at least one historical push advertisement.

There are several ways to determine the push content set based on the push content request. For example, the push content set may be requested from a content push system after the push content request is obtained. The content push system is a system for pushing contents to objects. The system may run in a terminal or a server as a client, and the system may store pushed contents, such as historical push contents and to-be-pushed contents. As an example, the push contents may be advertisements, and the content push system may be an advertisement serving platform running in a server. The platform may push advertisements.

For another example, different push content sets may be set for different object types. As an example, an object identifier of the object may be carried in the push content request of the object. The server may determine the object type of the object based on the object identifier, and determine a push content set corresponding to the object type as the push content set corresponding to the push content request.

For another example, different push content sets may be set for different times. As an example, different push content sets may be set for different time periods. After the push content request of the object is obtained, a push content set corresponding to the current time period is determined as the push content set corresponding to the push content request.

For another example, for different request keywords, a push content related to each request keyword may be selected from the content push system, so as to generate a push content set. As an example, the push content request of the object may carry a request keyword of the object, such as a search keyword, and the content push system may select a search content related to the search keyword from stored push contents based on the search keyword to generate the push content set corresponding to the push content request.

103. Detect historical behavior feature data of the object for a push content in response to a behavior feature of the object for the push content satisfying a preset negative behavior condition.

In an embodiment, the behavior feature of the object for the push content is a related feature that describes a content interaction behavior of the object for the push content. For example, the content interaction behavior for the push content may include a touch operation, such as click operation, long-press operation, double-click operation, and swipe operation, etc., and may also be an operation triggered by voice. In an embodiment, the content interaction behavior may also be a combination of a series of operations.

In an embodiment, the push content may be an advertisement and the object may be a user. In certain embodiment(s), the behavior feature of the object for the push content may be a related feature of an advertisement interaction behavior of the user for the advertisement. For example, the advertisement interaction behavior may include the user's advertisement click behavior, advertisement comment behavior, advertisement add-to-favorites behavior, advertising product purchase behavior, and so on.

In an embodiment, the preset negative behavior condition is used to determine whether the object has a negative content interaction behavior for the push content. The negative behavior is a content interaction behavior opposite to an active behavior, and the negative content interaction behavior may refer to the object's negative response to the push content, for example, means that the object does not produce a clicking behavior for the exposed push content, closes the exposed push content within a predetermined time threshold, has a behavior of blocking the push content, etc. Therefore, the preset negative behavior condition may be set based on the content interaction behavior of the object for the push content.

In one embodiment, the push content may be an advertisement, the object may be a user, and the preset negative behavior condition may be set based on the user's advertisement click behavior, advertisement comment behavior, advertisement add-to-favorites behavior, advertising product purchase behavior, and so on. For example, the preset negative behavior condition may be: there are more than 60 advertisement impressions in the same media during a predetermined time period (e.g., latest 30 days) but the user does not have any advertisement clicking behavior.

In an embodiment, the historical behavior feature data is feature data describing the historical behavior. The historical behavior refers to the historical behavior that describes the interest of the object for the push content. For example, the historical behavior may include the user's historical behavior on a news application, the historical behavior may describe the user's interest in advertisements, for example, the historical behavior may include a historical browsing behavior, historical like behavior, historical comment behavior, historical purchase behavior, etc. The corresponding historical behavior feature data may include feature data of a behavior occurrence time, for example, feature data of a browsing behavior occurrence time; include feature data a behavior duration, for example, feature data of a comment behavior duration; include feature data that describes the type of content on which the behavior is made, for example, feature data that describes the type of news viewed by the user; and so on.

In an embodiment of the present disclosure, the historical behavior feature data of the object for the push content may include historical behavior feature data of the object in different applications, for example, may include historical behavior feature data of the user in different applications.

In one embodiment, assuming that the push content is an advertisement and the object is a user, the user whose behavior feature for advertisements satisfies the preset negative behavior condition may be called a silent user. For example, the silent user may be a user for whom more than a preset number (for example, 60) of advertisement impressions have been made in the same media within the preset time period (for example, latest 30 days) and who has no advertisement clicking behavior. In this embodiment, a user terminal may send an advertisement request message to a content push system in a server. The advertisement request message may include a user identifier. After receiving the advertisement request message, the content push system may determine behavior information of a user corresponding to the user identifier according to the user identifier in the advertisement request message, determine a behavior feature of the user for the advertisement according to the behavior information, and determine whether the behavior feature of the user for the advertisement satisfies a preset negative behavior condition. When the behavior feature of the user for the advertisement satisfies the preset negative behavior condition, the content push system may determine that the user is a silent user and detect historical behavior feature data of the user for advertisements.

Further, in some embodiments, at least one target object may be determined in advance, and the at least one target object is stored in the content push system. When receiving a push content request from a terminal, the content push system determines whether a user corresponding to the push content request is one of the at least one target object, and if the user corresponding to the push content request is one of the at least one target object, determines the user corresponding to the push content request to be a target object. In this way, the speed of determining a target object by the content push system may be improved, thereby improving the speed of content pushing.

In some other embodiments, the content push system may also determine the user corresponding to the push content request after receiving the push content request from the terminal, determine behavior information of the user for the advertisement, and determine whether a behavior feature of the user for the advertisement satisfies a preset negative behavior condition according to the behavior information. When the behavior feature of the user for the advertisement satisfies the preset negative behavior condition, the content push system determines that the user is a target object, and further detect historical behavior feature data of the user for advertisements. In this way, the real-timeliness and accuracy of determining a target object by the content push system may be improved. In certain embodiment(s), the operation of "detecting historical behavior feature data of the object for a push content in response to a behavior feature of the object for the push content satisfying a preset negative behavior condition" may include:

obtaining behavior information of the object for the push content;
  statistically analyzing the behavior information to obtain the behavior feature of the object for the push content; and
  detecting the historical behavior feature data of the object for the push content in response to the behavior feature satisfying the preset negative behavior condition;

In an embodiment, the behavior information of the object for the push content is related information that describes a content interaction behavior of the object for the push content. For example, the related information may be statistics information that describes the historical content interaction behavior of the object for the push content. The content interaction behavior may include a touch operation for the push content, such as click operation, long-press operation, double-click operation, and swipe operation, etc., and may also be an operation triggered by voice. In an embodiment, the content interaction behavior may also be a combination of a series of operations.

As an example, the push content may be an advertisement, and the object may be a user. In certain embodiment(s), the behavior information of the object for the push content may be statistics information of the historical advertisement interaction behavior of the user for the advertisement. For example, the historical advertisement interaction behavior of the user may include user's historical advertisement click behavior, advertisement comment behavior, advertisement add-to-favorites behavior, advertising product purchase behavior, and so on. Correspondingly, the behavior information of the user may include statistics information on the historical advertisement interaction behavior of the user.

There are many ways to obtain the behavior information of the object for the push content, for example, the object may report behavior information of the object for the push content to the server, so that the server may obtain the behavior information. For another example, the content push system may collect the behavior information of the object for the push content in response to determining that data collection permission is obtained and a relevant regulation is met, and report the behavior information to the server, so that the server may obtain the behavior information. For another example, one or more servers where the content push system is located may store a delivery object of the push content and the behavior information of the delivery object, determine the delivery object as the object, and obtain the behavior information of the delivery object from a storage system of the server; and so on.

In the embodiments of the present disclosure, there are many ways to perform statistical analysis of the behavior information. For example, the corresponding statistical analysis of the behavior information may be performed based on certain definition of the behavior feature. For example, the behavior feature may include statistical features such as the total number, maximum value, and average value of behaviors for the push content within a preset time range. Therefore, the corresponding statistical analysis of the behavior information may be performed based on certain definition of the behavior feature to obtain the corresponding behavior feature.

In one embodiment, the content push system may be an advertisement serving platform A, the push content may be an advertisement, the object may be a user, and the preset negative behavior condition may be: the number of advertisement impressions in the same application in latest 30 days exceeds 60, and the user has no advertisement clicking behavior. Therefore, the server may obtain the number of advertisement impressions of the user in the same application, as well as the advertisement clicking behavior information of the user for the advertisement, and count the number of advertisement clicking behaviors of the user in the latest 30 days based on the advertisement clicking behavior information, and use the counting result as the behavior feature of the user for the advertisement.

Further, the historical behavior feature data of the object for the push content may be detected in response to the behavior feature of the user satisfying the preset negative behavior condition. As an example, if the user B has received more than 60 advertisement impressions in application A in the latest 30 days, and has no advertisement click behavior, user B may be determined as a silent user of application A, and historical behavior feature data of user B for advertisements may be further detected. For example, the historical behavior feature data of user B on other applications may be detected. "Historical behavior" herein refers to a historical behavior that describes the interest of object B for advertisements.

In one embodiment, it is considered that in practical applications, there may be an object which has a content push demand, but because the content push demand of the object is not captured or recognized by the content push system, the content push system has not pushed any content to the object in the past, and therefore may not accurately calculate the behavior feature of the object for the push content, resulting in that the user may not become a target object of content pushing. Therefore, In certain embodiment(s), a content push evaluation model of the content push system may be adjusted to avoid missing of potential target objects. In certain embodiment(s), the operation of "obtaining behavior information of the object for the push content" may include:

adjusting a content push evaluation threshold in a content push system;

transmitting the push content to the object based on the adjusted content push evaluation threshold; and obtaining the behavior information of the object for the push content in a present time range.

In an embodiment, the content push evaluation threshold is a threshold for determining to push a content to the object, for example, the content push evaluation threshold may be a threshold for the content push system to push a content to the object. In certain embodiment(s), the content push evaluation may be used to evaluate value that may be generated after the push content is pushed to the object. For example, if the push content is an advertisement and the object is a user, the content push evaluation is advertisement push evaluation. In certain embodiment(s), the advertisement push evaluation may be used to evaluate value that may be generated by pushing an advertisement to a user, or after one advertisement impression is made.

In practical applications, in order to avoid disturbing objects and improve the efficiency of content push, the push may be skipped if the content push evaluation result is lower than the content push evaluation threshold. Taking advertising as an example, if the content push evaluation result of pushing advertisement C to user B is less than the content push evaluation threshold, the push is not performed, that is, the advertisement C is not be exposed to user B.

Taking advertising as an example, some users may send an advertisement request, but because the advertisement push evaluation results of the system for these users may be low, no advertisement is pushed to these users, and therefore, no impressions and clicks are made. In certain embodiment(s), it may be impossible to determine whether these users are silent users or not. Consequently, the users who meets a silent user criterion become implicit silent users.

In an embodiment, the content push evaluation threshold may be adjusted in a variety of ways, for example, by lowering the original content push evaluation threshold, by setting the original content push evaluation threshold to a content push evaluation range, and so on.

Figure 3:
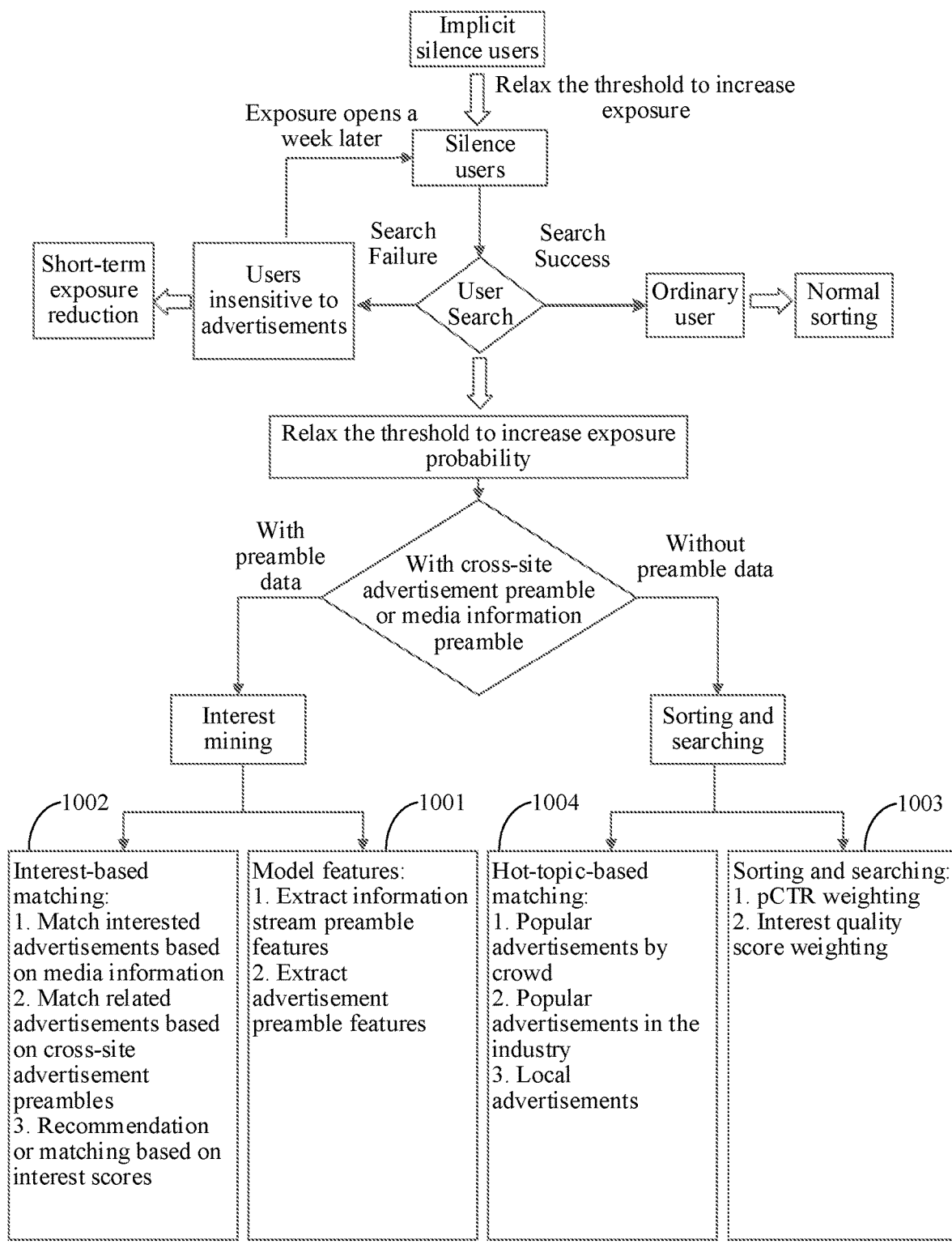
FIG. 3 is a schematic flowchart of a push content processing method according to certain embodiment(s) of the present disclosure.

In an embodiment, referring to a flowchart of a push content processing method shown in FIG. 3, the advertisement impressions for the implicit silent users may be increased by relaxing the advertisement push evaluation threshold, that is, lowering the advertisement push evaluation threshold, so as to change the implicit silent users into silent users.

After adjusting the content push evaluation threshold of the content push system, a push content may be transmitted to an object based on the adjusted content push evaluation threshold, and behavior information of the object for the push content in a preset time interval may be obtained.

104. Perform content-based matching for the push content set based on the historical behavior feature data to obtain a target push content set of the object, in response to the object having the historical behavior feature data.

In an embodiment, content-based matching refers to the process of selecting push contents from the push content set. In certain embodiment(s), in the embodiments of the present disclosure, the corresponding push content may be selected from the push content set by content-based matching, and added to the target push content set of the object. For example, in the advertising example, content-based matching is the process of selecting corresponding advertisements from an advertisement set and adding the advertisements to a target advertisement set of the user.

In an embodiment, the target push content set is a set of push contents selected from the push content set, for example, in the advertising example, the target push content set is a set of advertisements selected from the advertisement set. In the embodiment of the present disclosure, there may be multiple ways to perform content-based matching on the push content set based on the historical behavior feature data. Therefore, the push contents selected in different ways may be added to the target push content set of the object to generate the target push content set of the user.

There may be multiple ways to perform content-based matching on the advertisement set based on the historical behavior feature data. For example, in the advertising example, advertisements that a silent user has clicked on other sites may be selected from the advertisement set and added to the target advertisement set. For another example, advertisements that a silent user has clicked before silence may be selected and added to the target advertisement set. For another example, advertisements that have been clicked by a user having a relationship chain with a silent user may be selected and added to the target advertisement set. The user having a relationship chain with the silent user may be a user associated with the silent user, for example, may be a social friend of the silent user, or may be an address book friend of the silent user; and so on.

There may be multiple ways to perform content-based matching on the advertisement set based on the historical behavior feature data. In another embodiment, not only the historical behavior feature data may be taken into account, but also the content push evaluation model for the push content may be taken into account. The original content push evaluation model may be adjusted, and the content-based matching may be realized through the adjusted model. For example, the content push evaluation model may be adjusted by adding input features to the original content push evaluation model, so that the adjusted content push evaluation model may determine the content push evaluation result corresponding to the object by referring to the added features. In certain embodiment(s), the operation of "performing content-based matching for the push content set based on the historical behavior feature data to obtain a target push content set of the object" may include:

determining an original push evaluation model for the push content;

performing feature extraction of the historical behavior feature data to obtain a content interaction feature of the object for the push content;

adding the content interaction feature to the original push evaluation model so that the push evaluation model after the addition determines a content push evaluation result of the push content for the object by referring to the content interaction feature; and performing content-based matching for the push content set based on the content push evaluation result to obtain the target push content set of the object.

In an embodiment, the original push evaluation model refers to an unadjusted content push evaluation model, and the content push evaluation model is used to evaluate a push effect of pushing the push content to the object. For example, value generated by pushing the push content to the object may be used as the push effect.

The content push evaluation model may be implemented in many ways. For example, the content push evaluation model may be a linear model, a nonlinear model, or a combination of a linear model and a nonlinear model. For example, the nonlinear model may include a neural network model.

In one embodiment, taking advertising as an example, an expected effective cost per mile (eCPM) may be used as the content push evaluation result, so the original content push evaluation model may be: eCPM=pCTR×pCVR×Bid× Regulator+quality eCPM.

CTR represents the click-through rate. In certain embodiment(s), CTR may be defined as the number of clicks/ impressions. pCTR represents the Predict Click-Through Rate, that is, a user click probability calculated by a click-through rate estimation model in the advertisement push system for each advertisement in the advertisement set. pCTR represents the Predict Conversion Rate, that is, a user conversion probability calculated by a conversion rate estimation model in the advertisement push system for each advertisement in the advertisement set. eCPM represents the expected effective cost per mile, which is calculated based on the advertising bid, pCTR and pCVR, is used as the ranking basis of the advertising system and is directly linked to the revenue of the advertising system. Quality eCPM represents eCPM weighting provided by the system for high-quality advertisements from the perspective of long-term ecological impact, and common quality eCPM may include pCTR-based weighting, pCVR-based weighting, and so on.

In an embodiment, the content interaction feature describes a feature of the object when the content interaction behavior is performed for the push content, for example, the content interaction behavior may include a content browsing behavior, content like behavior, content comment behavior, content commodity purchase behavior, and so on.

In an embodiment, there are various ways of feature extraction. For example, vectorization may be used to generate a corresponding vector based on historical behavior feature data, and the vector may be used as the content interaction feature of the object. Another example is that a neural network model for feature extraction may be trained, historical behavior feature data may be used as model input, and the content interaction feature of the object may be generated through the neural network model; and so on.

In the advertising example, the object may be a silent user, and the historical behavior feature data of the object may include the silent user's historical advertisement clicking behavior, historical advertisement comment behavior, historical advertisement add-to-favorites behavior, historical advertising product purchase behavior, and so on.

In this example, as shown in 1001 in FIG. 3, the feature extraction may be performed on the historical behavior feature data of the silent user for the advertisement to extract the content interaction feature of the silent user. The extracted content interaction features may include an information stream preamble feature, such as a feature of an article video browsed by the silent user on the information stream consultation side. The extracted content interaction feature may include an advertisement preamble feature, for example, information features such as the silent users' historical advertisement impression and quick swipe. In addition, the extracted content interaction feature may also include behavior features before and after silence of the silent user, and so on.

Further, the extracted content interaction feature may be added to the original push evaluation model to adjust the original push evaluation model. For example, the extracted content interaction feature may be added as the input data of the original push evaluation model, so that the added push evaluation model may learn the relationship between these objects and the push content, so as to improve the recognition accuracy of the model and correct the error. In practical applications, the content interaction feature may also be updated regularly to update the input of the content push evaluation model regularly.

In the advertising example, the content push evaluation model may include a neural network model for calculating pCTR, and the extracted content interaction feature may be used as new input data of the neural network model on the basis of the original input data of the neural network model, so as to add the extracted content interaction feature to the original content push evaluation model, so as to adjust the original content push evaluation model.

In the embodiments of the present disclosure, after adjusting the original push evaluation model for push contents to obtain the adjusted push evaluation model, the content push evaluation result of each push content corresponding to the object in the push content set may be calculated based on the adjusted push evaluation model.

In an embodiment, the content push evaluation result is used to measure the push effect generated by pushing the push content to the object. In certain embodiment(s), after calculating the push evaluation result of the object for the push content, the push effect generated by pushing the push content to the object may be estimated. In the advertising example, eCPM may be used as the content push evaluation result, for example, value generated by pushing advertising E to user D may be estimated by calculating the eCPM of silent user D for advertisement E.

Further, based on the calculated push evaluation result, the corresponding push content may be selected from the push content set and added to the target push content set of the object to realize the content-based matching of the push content set and obtain the target push content set of the object.

There may be a variety of ways to select the corresponding push content from the push content set based on the push evaluation result. For example, based on the push evaluation result, the push contents may be sorted to obtain sorted push contents, and further, a preset quantity or preset proportion of push contents may be selected from the sorted push contents. For another example, push contents falling within a preset sequence number range may be selected from the sorted push contents; and so on. Further, the selected push contents may be added to the target push content set of the object.

In another embodiment, when the object has historical behavior feature data, the object's preference information for the push content may be determined based on the historical behavior feature data, so that based on the preference information, the content-based matching may be performed for the push content set. In certain embodiment(s), the operation of "performing content-based matching for the push content set based on the historical behavior feature data to obtain a target push content set of the object" may include:

determining preference information of the object for the push content based on the historical behavior feature data; and performing content-based matching for the push content set based on the preference information to obtain the target push content set of the object.

In an embodiment, the object's preference information for the push content is related information used to describe the object's preference for the push content, for example, the preference information may be determined based on the object's historical behaviors on contents, for example, may be determined based on the object's historical search behavior, historical clicking behavior, historical viewing behavior, historical purchase behavior, historical add-to-favorites behavior, etc.

The preference information may take many forms. For example, the preference information may exist in the form of interest tags. For another example, the preference information may exist in the form of interest quality scores; and so on.

In an embodiment, content-based matching refers to the process of selecting the push content from the push content set. There are many ways to perform content-based matching for the push content set based on the preference information. In the advertising example, referring to 1002 in FIG. 3, interest advertisements may be selected from the advertisement set based on the media information, relevant advertisements may be selected from the advertisement set based on a cross-site advertisement preamble, and relevant advertisements may be selected from the advertisement set based on the interest quality scores.

In one embodiment, based on the interest tag of the object, the push content matching the interest tag may be selected from the push content set, and the selected push content may be added to the target push content set of the object. For example, the target industry and target product that the object is interested in may be determined based on the interest tag of the object, the advertisement that matches the target industry and the advertisement that matches the target product may be selected from the advertisement set, and the selected advertisements may be added to the user's target advertisement set. In certain embodiment(s), when applied to advertising, this process is the process of selecting interest advertisements from historical advertisement sets based on a media information preamble shown in 1002 in FIG. 3.

In another embodiment, based on the object's preference information for the push content, an object group to which the object belongs may be determined, so that the content-based matching for the push content set may be performed through the object group to which the object belongs, to obtain the target push content set of the object. In certain embodiment(s), the operation of "performing content-based matching for the push content set based on the preference information to obtain the target push content set of the object" may include:

> determining an object group to which the object belongs based on the preference information;
> selecting push contents associated with the object group from the push content set;
> sorting the selected push contents to obtain sorted push contents; and
> performing content-based matching for the sorted push contents based on a result of the sorting to obtain the target push content set of the object.

In an embodiment, the object group is a set of objects composed of at least one object. For example, if the object is a user, the object group may be a set of users including at least one user.

There are many ways to determine the object group to which the object belongs based on preference information. For example, the object group to which the object belongs may be determined based on different forms of preference information.

In one embodiment, the form of preference information may be an interest tag, and the object group to which the object belongs may be determined based on the interest tag of the object for the push content. For example, an object group may be generated by selecting objects having a common interest tag, and according to an interest tag of an object, objects having a common interest tag as the object may be determined based on the interest tag of the object, so as to determine the object group to which the object belongs.

In another embodiment, the form of preference information may be the interest quality score. The object group to which the object belongs may be determined based on the interest quality scores of the object for different types of push contents. For example, the object group may be generated by selecting objects with similar interest quality scores for the same type of push content. According to the interest quality scores of the object for different types of push contents, objects having a similar interest quality score to the object for the same type of push content may be determined, so as to determine the object group to which the object belongs. In an embodiment, similar measurement criteria may be set based on service requirements.

Further, push contents associated with the object group may be selected from the push content set. The association may be realized in many ways, for example, the push content browsed by any member object in the object group may be used as the push content associated with the object group. For another example, based on statistics information of push contents, the push contents browsed by all member objects in the object group may be sorted, and some of the push contents may be selected based on the sorting result as the push contents associated with the object group; and so on.

Further, the selected push content may be sorted in various ways. For example, the selected push content may be sorted based on the statistics information of push contents. In certain embodiment(s), in the advertising example, the selected advertisements may be sorted based on the CTR of each advertisement. For another example, the selected advertisements may be sorted based on the CVR of each advertisement; and so on.

There are many ways to determine the corresponding push content from the sorted push contents based on the sorting result. For example, a preset quantity or preset proportion of push contents may be selected from the sorted push contents. For another example, push contents falling within a preset sequence number range may be selected from the sorted push contents; and so on. Further, the selected push contents may be added to the target push content set of the object.

In another embodiment, content-based matching for the pushed content set based on preference information may be achieved by combining the preference information of the object for the push content and content description information of the push content. In certain embodiment(s), the operation of "performing content-based matching for the push content set based on the preference information to obtain the target push content set of the object" may include:

> obtaining content description information of the push content;
> performing content preference matching between the object and the push content based on the preference information and the content description information; and
> performing content-based matching for the push content set based on a result of the matching to obtain the target push content set of the object.

In an embodiment, the content description information of the push content is information that describes the push content, for example, may be in the form of a tag to describe the push content. For another example, the content description information may be in the form of an image to describe the push content; and so on.

In an embodiment, the content preference matching is used to determine the degree of preference of the object for the push content. In certain embodiment(s), through the content preference matching between the object and the push content, the interest of the object in the push content may be determined.

There are many ways to perform content preference matching between the object and the push content based on the preference information and the content description information. In certain embodiment(s), it may be determined based on the forms of preference information and content description information.

In an embodiment, the forms of the preference information and the content description information may both be tags, and the object may include at least one tag representing preference information. The push content may include at least one tag representing content description information. Therefore, content preference matching may be performed between the object and the push content based on the tags of the object and the push content. For example, the result of content preference matching between the object and the push content may be determined based on the number of tags that the object and the push content have in common. For another example, the tags of the object and the push content may be converted into corresponding vectors through vectorization, and the result of content preference matching between the object and the push content may be determined by calculating the distance between the vectors; and so on.

In another embodiment, the forms of the preference information and the content description information may be images, and the result of content preference matching between the object and the push content may be determined based on computation performed on the image. For example, the result of content preference matching may be determined by calculating an image relevance. For another example, the result of content preference matching may be determined by calculating an image similarity; and so on.

Further, content-based matching may be performed for the push content set based on a result of the matching. For example, the corresponding push content may be selected from the push content set based on the result of the matching and added to the target push content set. For example, the push contents in the push content set may be sorted based on the result of the matching, and the corresponding push content may be selected from the sorted push contents and added to the target push content set. For example, a preset quantity or preset proportion of push contents may be selected from the sorted push contents. For another example, push contents falling within a preset sequence number range may be selected from the sorted push contents; and so on.

105. Perform content sorting of the push content set and perform content-based matching of the push content of the object to obtain a target push content set of the object, in response to the object not having the historical behavior feature data.

In an embodiment, the content sorting of the push content set refers to the process of sorting the push contents in the push content set to obtain the sorted push content. In the embodiment of the present disclosure, there may be multiple ways to perform the content sorting of the push content set. Therefore, the push contents selected in different ways may be added to the target push content set of the object to generate the target push content set of the user.

There may be multiple ways to perform the content sorting of the push content set and select the push content for the object. For example, it may be realized by sorting and searching. In certain embodiment(s), the operation of "performing content sorting of the push content set and determine the push content of the object to obtain a target push content set of the object" may include:

obtaining push statistics information of the push content and preference information of the object for the push content;

determining a content push evaluation parameter for the push content based on the push statistics information and the preference information;

performing content sorting of the push content set based on the content push evaluation parameter and determine the push content of the object to obtain the target push content set of the object.

In an embodiment, the push statistics information of the push content is relevant information obtained when the push content is pushed. For example, the push statistics information of the push content may include statistics information of the content interaction behavior of the object for the push content. The statistics information is information obtained through statistical analysis. For example, the statistics information may include a sum, mean, median, mode, maximum, minimum, and so on.

Taking advertising as an example, the push statistics information of advertisements may include statistics information obtained after statistical analysis of advertisement interaction behaviors such as advertisement clicking behavior, advertisement comment behavior, advertisement add-to-favorites behavior, and advertising product purchase behavior. For example, the push statistics information may include CTR, CVR and other push statistics for advertisements.

In an embodiment, the object's preference information for the push content is related information used to describe the object's preference for the push content, for example, the preference information may be determined based on the object's historical behaviors on contents, for example, may be determined based on the object's historical search behavior, historical clicking behavior, historical viewing behavior, historical purchase behavior, historical add-to-favorites behavior, etc.

The preference information may take many forms. For example, the preference information may exist in the form of an interest tag, which may be used to represent the object's interest in the content related to the interest tag, so as to determine that the object has a preference for the push content related to the interest tag. For another example, the preference information may exist in the form of interest quality scores. In certain embodiment(s), a model may be established based on the object's preference information to estimate the interest quality scores of the object for different types of push contents, for example, to estimate the interest quality scores of the target for the push contents of different industries, to estimate the interest quality scores of the target for the push contents of different products, and so on.

In the advertising example, the silent user's interest tag for the advertisement may be used to characterize the silent user's interest in the content related to the interest tag, for example, if the silent user's interest tag for the advertisement is pet, it indicates that the silent user is interested in pet-related contents, so that it may be determined that the silent user has a preference for pet-related advertisements.

In an embodiment, the content push evaluation parameter is a parameter used to assist in the content push evaluation. In certain embodiment(s), the push contents in the push content set may be sorted based on the content push evaluation parameter so that the content push evaluation result may be determined based on the sorting result.

There are many ways to determine the content push evaluation parameter for the push content based on the push statistics information and the preference information. For example, a first evaluation parameter for the push content may be determined based on the push statistics information. As an example, the push statistics information may be CRT, and pCTR may be used as the first evaluation parameter for the push content. For another example, the push statistics information may be CVR, and pCVR may be used as the first evaluation parameter for the push content; and so on.

As another example, a second evaluation parameter for the push content may be determined based on preference information. As an example, the preference information may be the object's interest quality score for the push content, and the interest quality score may be used as the second evaluation parameter for the push content.

Further, the content push evaluation parameter for the push content may be determined based on the first evaluation parameter and the second evaluation parameter. For example, the content push evaluation parameter may be selected from the first evaluation parameter and the second evaluation parameter. For another example, both the first evaluation parameter and the second evaluation parameter may be used as the content push evaluation parameters; and so on.

After the content push evaluation parameter is determined, content sorting of the push content set may be performed based on the content push evaluation parameter and content-based matching of the push content of the object may be performed to obtain the target push content set of the object. In certain embodiment(s), the operation of "performing content sorting of the push content set based on the content push evaluation parameter and determine the push content of the object to obtain the target push content set of the object" may include:

determining an original push evaluation model for the push content;

adding the content push evaluation parameter to the original push evaluation model so that the push evaluation model after the addition determines a content push evaluation result of the push content for the object based on the content push evaluation parameter;

performing content sorting of the push content set based on the content push evaluation result; and determining the push content of the object based on a result of the sorting, to obtain the target push content set of the object.

After the content push evaluation parameter for the push content is determined, the determined content push evaluation parameter may be added to the content push evaluation model to adjust the content push evaluation model. In certain embodiment(s), the process of content push evaluation through the adjusted content push evaluation model is the process of using the content push evaluation parameter to assist in the content push evaluation.

In one embodiment, the content push evaluation model may be: eCPM=pCTR×pCVR×bid×regulator+quality eCPM, and the operation of "adding the content push evaluation parameter to the content push evaluation model to adjust the content push evaluation model" may be the sorting and searching process shown in 1003 in FIG. 3. As an example, the content push evaluation parameter may be pCTR, and the content push evaluation parameter may be added to the content push evaluation model to adjust the content push evaluation model as follows: eCPM'=eCPM+alpha×pCTR, where alpha is the coefficient term corresponding to pCTR. In this way, only requests from silent users may be weighted, so that push efficiency may be improved as much as possible without increasing the costs. As an example, the content push evaluation parameter may be an interest quality score S, and the content push evaluation parameter may be added to the content push evaluation model to adjust the content push evaluation model as follows: eCPM'=eCPM+beta×S, where beta is the coefficient term corresponding to S.

In the embodiments of the present disclosure, and the content push evaluation parameter is added to the original push evaluation model to obtain the adjusted push evaluation model, the content push evaluation result of each push content corresponding to the object in the push content set may be calculated based on the adjusted push evaluation model.

In an embodiment, the content push evaluation result is used to measure the push effect generated by pushing the push content to the object. In certain embodiment(s), after calculating the push evaluation result of the object for the push content, the push effect generated by pushing the push content to the object may be estimated.

In the advertising example, eCPM may be used as the content push evaluation result, for example, value generated by pushing advertising E to user D may be estimated by calculating the eCPM of silent user D for advertisement E.

Further, based on the calculated content push evaluation result, the push contents in the push content set may be sorted, and based on the sorting result, the corresponding push content may be selected from the push content set and added to the target push content set of the object. For example, a preset quantity or preset proportion of push contents may be selected from the sorted push contents. For another example, push contents falling within a preset sequence number range may be selected from the sorted push contents; and so on. Further, the selected push contents may be added to the target push content set of the object.

There may be multiple ways to perform the content sorting of the push content set and select the push content for the object. For example, it may be realized by hot advertisement matching. In certain embodiment(s), for example, in the advertising example, hot advertisements corresponding to crowds corresponding to silent users may be selected, hot advertisements of various industries may be selected, local advertisements of silent users may be selected, and so on. In certain embodiment(s), the operation of "performing content sorting of the push content set and determine the push content of the object to obtain a target push content set of the object" may include:

obtaining content attribute information of the push content and object attribute information of the object for the push content; and performing content sorting of the push content set based on the content attribute information and the object attribute information and determine the push content of the object to obtain the target push content set of the object.

In an embodiment, the content attribute information of the push content is relevant information describing an attribute of the push content, for example, the content attribute information may include geographical location information of the push content, industry information, involved commodity information, target audience information, and the like.

In an embodiment, the object attribute information of the object is related information describing an attribute of the object. For example, taking the object as an example, the object attribute information of the object may include the user's gender information, age information, geographical location information, occupation information, and the like.

For example, there are many ways to perform content sorting of the push content set based on the content attribute information and the object attribute information. For example, the content sorting of the push content set is performed based on the geographical location information of the push content and the geographical location information of the object. For example, a higher association between the geographical attribution information of the push content and the geographical location information of the object indicates a higher weight of the push content in the content sorting. In certain embodiment(s), taking advertising as an example, referring to 1004 in FIG. 3, because local advertisements are generally delivered by local "small and beautiful" merchants and may bring users a certain sense of freshness, stimulate users' interest, and efficiently promote clicks and conversions, the advertisements in the advertisement set may be sorted based on the geographical location information of the advertisements and the geographical location information of silent users, so that the local advertisements may have a higher weight for the silent users. In this way, the local advertisements for the silent users may be selected from the advertisement set and added to the target advertisement set for the silent users.

For example, the content sorting of the push content set may be performed based on the industry information of the push content. For example, the push contents belonging to different industries may be sorted respectively to obtain sorting results of the push contents under each industry, and the top-ranking push contents in each industry are selected and added to the target push content set of the object. In certain embodiment(s), taking advertising as an example, referring to 1004 in FIG. 3, hot push contents in each industry may be selected from the advertisement set and added to the target advertisement set based on the industry information of the push advertisements.

For another example, based on the object attribute information of the object, the crowd corresponding to the object may be determined, and expected hot push contents in the corresponding crowd may be selected from the push content set and added to the target push content set of the object. In certain embodiment(s), taking advertising as an example, referring to 1004 in FIG. 3, hot advertisements may be selected from the advertisement set corresponding to the crowd to which the silent user belongs based on the silent user's age information, gender information, occupation information, and the like, and added to the user's target advertisement set.

In an embodiment, popularity measurement may be realized in a variety of ways, for example, by sorting the push contents and determining the popular push content based on the sorting result. In certain embodiment(s), the operation of "performing content sorting of the push content set based on the content attribute information and the object attribute information and determine the push content of the object to obtain the target push content set of the object" may include:

selecting push contents to be sorted from the push content set based on the content attribute information and the object attribute information;

sorting the push contents to be sorted to obtain sorted push contents; and determining the push content of the object from the sorted push contents based on a result of the sorting, to obtain the target push content set of the object.

In an embodiment, the storing may be realized in various ways, for example, based on the release time of the push content, based on the historical push effect of the push content, and so on. taking advertising as an example, the historical push effects of advertisements may be determined based on the impressions, click-through rate, like rate, add-to-favorites rate, comment rate, etc., and the advertisements may be sorted based on the historical push effects.

There are many ways to select the push content from the sorted push contents. For example, a preset quantity or preset proportion of push contents may be selected from the sorted push contents. For another example, push contents falling within a preset sequence number range may be selected from the sorted push contents; and so on. Further, the selected push contents may be added to the target push content set of the object.

106. Determine a target push content of the object from the target push content set, and transmit the target push content to the object.

In an embodiment, there are many ways to determine the target push content of the object from the target push content set. For example, the content push evaluation result of each push content may be calculated by the content push evaluation model, the push contents in the target push content set may be sorted based on the calculation results to obtain sorted push contents, and the target push content of the object is determined based on the sorting result. In certain embodiment(s), the operation of "determining a target push content of the object from the target push content set" may include:

calculating the content push evaluation result of the push content through the content push evaluation model; and determining the target push content of the object from the target push content set based on the calculation result.

In an embodiment, the content push evaluation model may include the original push evaluation model, or may include an adjusted content push evaluation model, wherein the adjusted content push evaluation model may include an added push evaluation model obtained after adding content push evaluation parameters to the original push evaluation model, including an added push evaluation model obtained after adding content interaction features to the original push evaluation model, and the like.

For example, the content push evaluation result of each push content may be calculated by the content push evaluation model, the push contents in the push content set may be sorted based on the calculation results to obtain sorted push contents. Further, the target push content of the object may be determined from the sorted push contents. For example, a preset quantity or preset proportion of push contents may be selected from the sorted push contents. For another example, push contents falling within a preset sequence number range may be selected from the sorted push contents; and so on.

For another example, the determining of the target push content of the object from the sorted push contents may include two stages: coarse sorting and fine sorting. In the process of coarse sorting, a certain quota may be reserved for candidate push contents having a high degree of content preference matching with the target object, so as to increase the probability of selecting the candidate push content in the fine sorting. For example, the operation of "determining a target push content of the object from the target push content set" may include:

obtaining the result of content preference matching between the candidate push content and the target object; determining weight information corresponding to the candidate push content based on the result of content preference matching; and determining the target push content of the target object from the candidate push content set based on the weight information.

In the embodiments of the present disclosure, after the target push content of the object is determined from the target push content set, the target push content to the object may be transmitted. For example, the server may determine the target push content of the object from the target push content set through the content push system, and further, transmits the target push content to the object. In the advertising example, the server may determine a target advertisement for a silent user from the target advertisement set through the advertisement push system, and send the target advertisement to the silent user, so as to recommend advertisements that the silent user is interested in.

In addition, in practical applications, if the behavior feature of the object for the push content satisfies the preset negative behavior condition, there may be two reasons. First, an object which has a content push demand, but because the content push demand of the object is not captured or recognized by the content push system, the content push system has not pushed any content to the object in the past, and therefore may not accurately calculate the behavior feature of the object for the push content, resulting in that the user may not become a target object of content pushing. Second, the object is really not interested in the push content. Therefore, in the embodiments of the present disclosure, after the target push content of the object is determined and transmitted to the object, the object type of the object for the push content may be further evaluated based on a target behavior feature of the object for the target push content. In certain embodiment(s), the push content processing method may also include:

determining a target behavior feature of the object for the target push content; and determining an object type of the object for the push content according to the target behavior feature and the preset negative behavior condition.

In an embodiment, there are various ways to determine the target behavior feature of the object for the target push content. For example, target behavior information of the object for the target push content is obtained; and the target behavior information is statistically analyzed to obtain the target behavior feature of the object for the target push content. For an implementation, reference may be made to the operation of "obtaining behavior information of the object for the push content; statistically analyzing the behavior information to obtain the behavior feature of the object for the push content, and the details will not be repeated herein.

In an embodiment, the object type of the object for the push content is used to describe whether the object is a user who is not interested in the push content. In certain embodiment(s), corresponding to the reasons for satisfying the preset negative behavior condition, the object type of the object for the push content may include the following two types: One is an object type sensitive to the push content. An object of this object type is interested in the push content. However, because the content push system does not capture the object's real interest in the push content, the content push system may not recommend a push content that the user is interested in, and the object has a negative response to the push content recommended by the content recommendation system. The other is an object type insensitive to the push content. Because an object of this object type naturally resists the push content, the object has a negative response to the push content recommended by the content recommendation system. The object's negative response to the push content may include that the object does not produce a clicking behavior for the exposed push content, closes the exposed push content within a predetermined time threshold, has a behavior of blocking the push content, etc.

Therefore, after the target behavior feature of the object for the target push content is determined, the object type of the object for the push content may be determined according to the target behavior feature and the preset negative behavior condition. For example, if the target behavior feature satisfies the preset negative behavior condition, it is determined that the object belongs to the object type insensitive to the push content. If the target behavior feature does not satisfy the preset negative behavior condition, it is determined that the object belongs to the object type sensitive to the push content.

In the advertising example, referring to FIG. 3, a target advertisement for a silent object may be determined from a target advertisement set by the push content processing method described in the embodiments of the present disclosure, and the target advertisement is transmitted to the silent object, to conduct user exploration on the silent user, in order to explore the probability of the silent user being converted into an ordinary user. The ordinary user refers to a user who is sensitive to the push content, that is, sensitive to the advertisement.

In this example, referring to FIG. 3, it may be seen that some silent users are activated and become ordinary users and exit the exploration, while some silent users are still silent after exploration, indicating that the silent user is not interested in any advertisement and will not bring benefits to the platform, so in the short term, advertisement exposure may be reduced to reduce the interruption to the user.

By this solution, an object whose behavior feature for a push content meets the preset negative behavior condition may be determined as a target object, and after obtaining a push content request from the target object, it is determined how to perform content-based matching of the push content of the target object from the push content set based on whether the target object has historical behavior feature data for the push content, so as to achieve content pushing for the target object with enhanced accuracy. In certain embodiment(s), if the target object has the historical behavior feature data for the push content, content-based matching may be performed based on the historical behavior feature data in this solution. In this way, the push content of interest to the target object may be more accurately selected by referring to the content interaction history of the target object for the push content.

If the target object does not have the historical behavior feature data for the push content, the corresponding push content may be determined from the push content set through sorting and searching in this solution, to increase the probability of selecting the push content of interest to the target object. Therefore, this solution may improve the efficiency of processing the push content when implementing content pushing to the target object, thereby improving the push accuracy and efficiency of content pushing to the target object.

In addition, when the solution is applied in an advertisement pushing scenario, silent users may be activated in various ways to improve the interaction between users that have not clicked any advertisement and the advertising system, thereby improving the recommendation precision of the advertising system. Therefore, the solution may increase the probability of exposing advertisements that users are interested in, improve user experience, and benefit user activity and maintenance in the long run. For media, the solution may increase the conversion rate of users' clicks on advertisements and improve the GMV of media traffic. For the advertising system, the solution may improve the clicks and conversions generated by users in the system, and help improve the system's ability to identify the real business interests of users.

The method described according to the embodiments will be further detailed through the following examples.

In this embodiment, integration of a push content processing apparatus in a server and a terminal is used as an example for description. The server may be one server, or may be a server cluster including a plurality of servers. The terminal may be a mobile phone, a tablet computer, a notebook computer, or the like.

Figure 4:
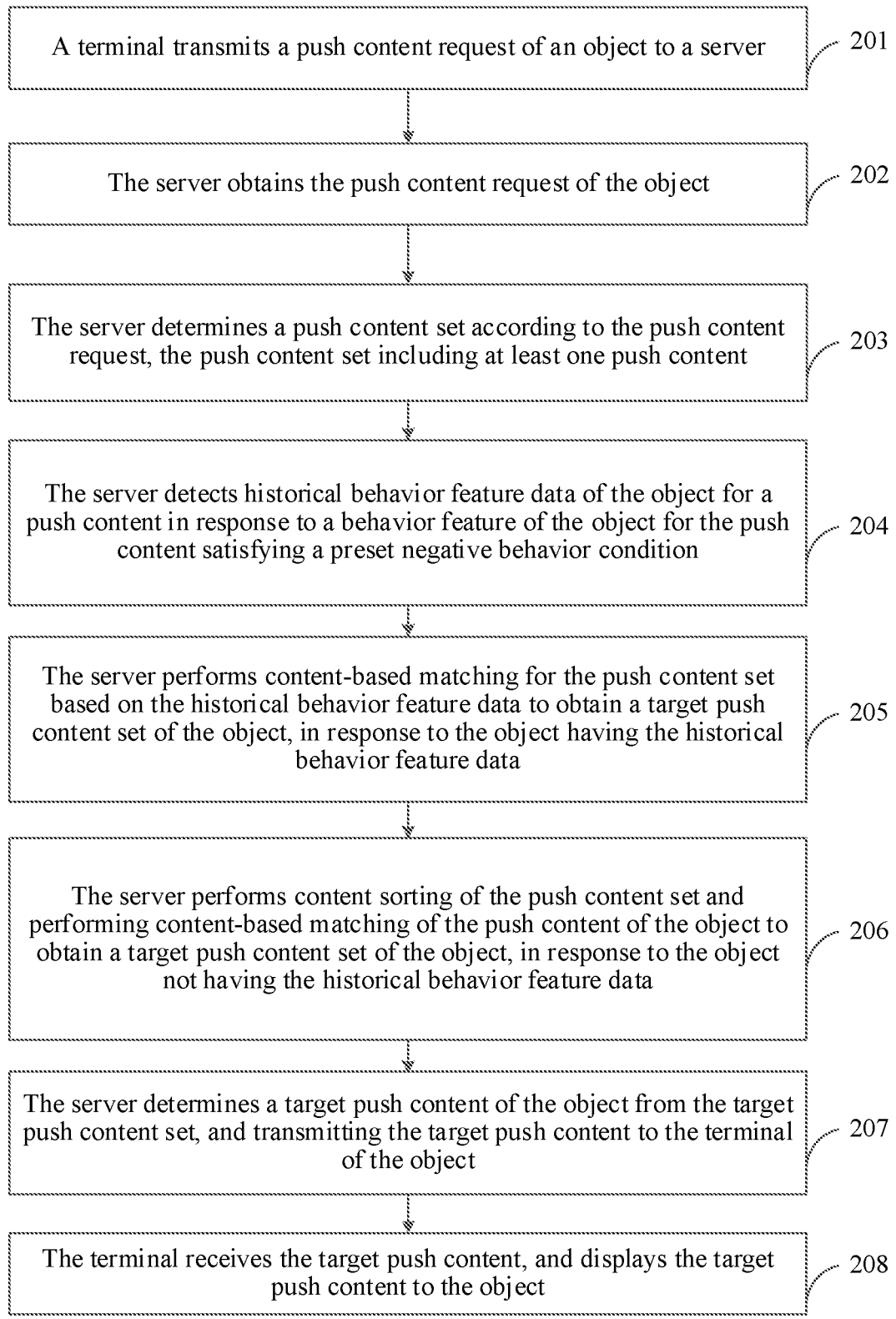
FIG. 4 is a schematic flowchart of a push content processing method according to certain embodiment(s) of the present disclosure.

As shown in FIG. 4, the process of a pushing content processing method includes the following operations 201-208:

201. A terminal transmits a push content request of an object to a server.

In one embodiment, the push content processing method described in the embodiments of the present disclosure may be applied to a search application. The push content may be an advertisement, and the object may be a user of the search application. In addition to providing a search result to a user, the search application may also display a relevant advertisement to the user when displaying the search result, to push a content to the user. Therefore, when the user generates a search request in the search application, an advertisement request may be generated correspondingly, and the terminal may transmit the search request and the advertisement request to the server.

202. The server obtains the push content request of the object.

203. The server determines a push content set according to the push content request, the push content set including at least one push content.

In one embodiment, the push content set determined by the server according to the push content request may include a historical push content set and a to-be-pushed content set. The historical push content set may include at least one historical push content. The to-be-pushed content set may include at least one to-be-pushed push content. For example, in the advertising example, the advertisement set determined by the server according to the advertisement request may include a historical advertisement set and a to-be-pushed advertisement set.

204. The server detects historical behavior feature data of the object for a push content in response to a behavior feature of the object for the push content satisfying a preset negative behavior condition.

In the advertising example, the preset negative behavior condition may be: the number of advertisement impressions in the same application in latest 30 days exceeds 60, and the user has no advertisement clicking behavior. If a behavior feature of a user for an advertisement satisfies the preset negative behavior condition, the user may be determined as a silent user for the advertisement in the search application. Further, historical behavior feature data of the silent user for the advertisement may be detected. For example, the historical behavior feature data may refer to preamble information of the silent user in media information and cross-media preamble information.

The manner of setting the preset negative behavior condition is not limited in the embodiments of the present disclosure, and may be expanded or simplified according to an implementation scenario. In addition, the form of the historical behavior feature data is not limited in the embodiments of the present disclosure, and may be expanded or simplified according to an implementation scenario.

205. The server performs content-based matching for the push content set based on the historical behavior feature data to obtain a target push content set of the object, in response to the object having the historical behavior feature data.

There may be multiple ways to perform content-based matching for the push content set based on the historical behavior feature data. For example, in the advertising example, the server may determine an interest of the silent user based on the historical behavior feature data, so that advertisements may be selected from the advertisement set through interest-based matching. For another example, the server extracts a content interaction feature based on the historical behavior feature data, adds the content interaction feature to the content push evaluation model to adjust the content push evaluation model to obtain an adjusted model, and selects advertisements from the advertisement set through the adjusted model. For example, interest-based matching may include selecting advertisements that the silent user is interested in based on a media information preamble, selecting related advertisements based on a cross-site advertisement preamble, selecting related advertisements based on interest quality points, and so on. The content interaction feature may include an information stream preamble feature, an advertisement preamble feature, and so on.

206. The server performs content sorting of the push content set and performing content-based matching of the push content of the object to obtain a target push content set of the object, in response to the object not having the historical behavior feature data.

There are many ways to perform content sorting of the push content set. For example, in the advertising example, the server may sort the advertisements in the advertisement set based on popularity of the advertisements, and select hot advertisements from the sorted advertisements. For another example, the server may add the content push evaluation parameter to the content push evaluation model to adjust the content push evaluation model to obtain an adjusted model, sort the advertisements in the advertisement set through the adjusted model, and select advertisements based on the sorting result. For example, selection of hot advertisements may include hot advertisements by crowd, hot advertisements by industry, local advertisements, and so on. The dimension for statistical analysis of hot advertisements is not limited in the embodiments of the present disclosure, and may be expanded or simplified according to an implementation scenario.

207. The server determines a target push content of the object from the target push content set, and transmitting the target push content to the terminal of the object.

208. The terminal receives the target push content, and displays the target push content to the object.

It may be seen that by the embodiments of the present disclosure, an object whose behavior feature for a push content meets the preset negative behavior condition may be determined as a target object, and after obtaining a push content request from the target object, it is determined how to perform content-based matching of the push content of the target object from the push content set based on whether the target object has historical behavior feature data for the push content, so as to achieve content pushing for the target object with enhanced accuracy. In certain embodiment(s), if the target object has the historical behavior feature data for the push content, content-based matching may be performed based on the historical behavior feature data in the embodiments of the present disclosure. In this way, the push content of interest to the target object may be more accurately selected by referring to the content interaction history of the target object for the push content. If the target object does not have the historical behavior feature data for the push content, the corresponding push content may be determined from the push content set through sorting and searching in the embodiments of the present disclosure, to increase the probability of selecting the push content of interest to the target object. Therefore, the embodiments of the present disclosure may improve the efficiency of processing the push content when implementing content pushing to the target object, thereby improving the push accuracy and efficiency of content pushing to the target object.

In addition, when applied in the advertisement pushing scenario, the solution is used to activate silent users, and may be realized through policies including user interest mining, hot advertisement selection and sorting formula adjustment, to improve the click-through rate of silent users on advertisements and the GMV of the system.

To implement the method better, correspondingly, an embodiment of the present disclosure further provides a push content processing apparatus. The push content processing apparatus may be integrated in a server or a terminal. The server may be one server, or may be a server cluster including a plurality of servers. The terminal may be a mobile phone, a tablet computer, a notebook computer, or the like.

Figure 5:
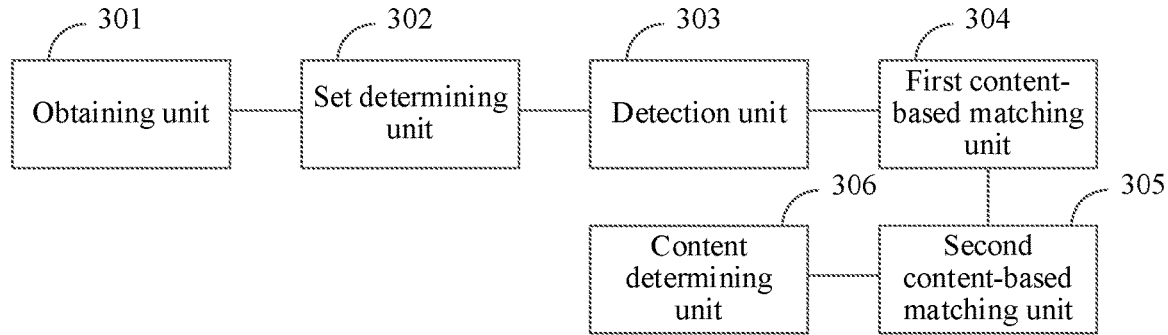
FIG. 5 is a schematic structural diagram of a push content processing apparatus according to certain embodiment(s) of the present disclosure.

For example, as shown in FIG. 5, the push content processing apparatus may include an obtaining unit 301, a set determining unit 302, a detection unit 303, a first content-based matching unit 304, a second content-based matching unit 305, and a content determining unit 306.

The obtaining unit 301 may be configured to obtain a push content request from an object.

The set determining unit 302 may be configured to determine a push content set according to the push content request, the push content set including at least one push content.

The detection unit 303 may be configured to detect historical behavior feature data of the object for a push content in response to a behavior feature of the object for the push content satisfying a preset negative behavior condition.

The first content-based matching unit 304 may be configured to perform content-based matching for the push content set based on the historical behavior feature data to obtain a target push content set of the object, in response to the object having the historical behavior feature data.

The second content-based matching unit 305 may be configured to perform content sorting of the push content set and perform content-based matching of the push content of the object to obtain a target push content set of the object, in response to the object not having the historical behavior feature data.

The content determining unit 306 may be configured to determine a target push content of the object from the target push content set, and transmit the target push content to the object.

Figure 6:
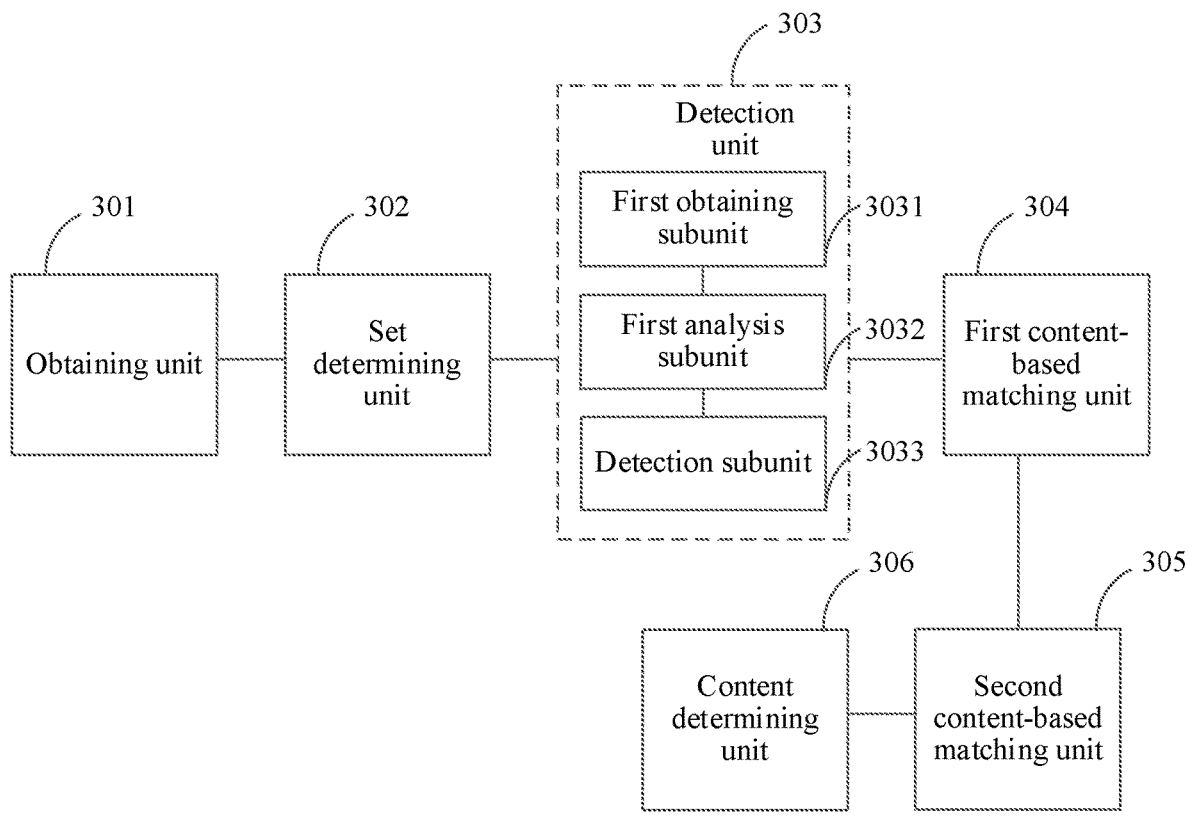
FIG. 6 is a schematic structural diagram of a push content processing apparatus according to certain embodiment(s) of the present disclosure.

In this embodiment, referring to FIG. 6, the detection unit 303 may include:
- a first obtaining subunit 3031, which may be configured to obtain behavior information of the object for the push content;
- a first analysis subunit 3032, which may be configured to statistically analyze the behavior information to obtain the behavior feature of the object for the push content; and
- a detection subunit 3033, which may be configured to detect the historical behavior feature data of the object for the push content in response to the behavior feature satisfying the preset negative behavior condition.

In one embodiment, the first obtaining subunit 3031 may be configured to:
adjust a content push evaluation threshold in a content push system; transmit the push content to the object based on the adjusted content push evaluation threshold; and obtain the behavior information of the object for the push content in a present time range.

Figure 7:
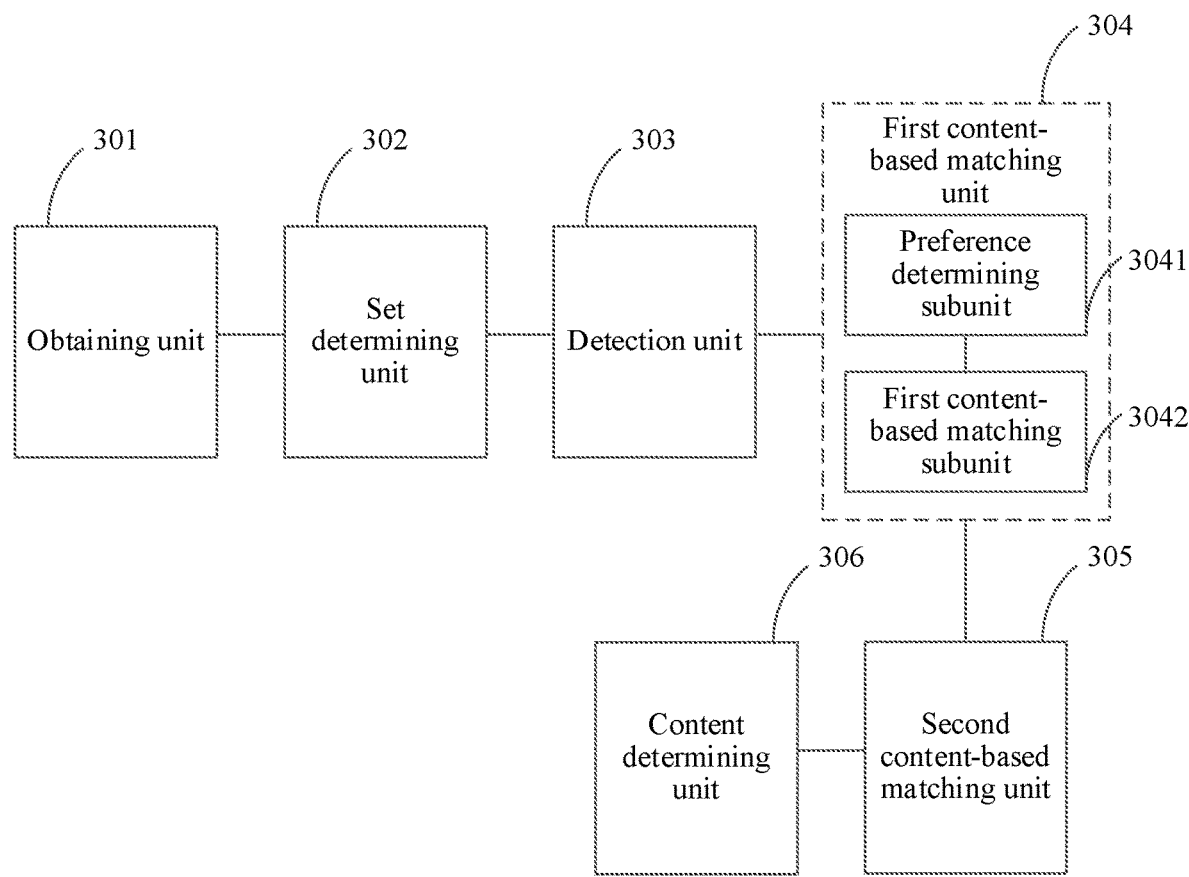
FIG. 7 is a schematic structural diagram of a push content processing apparatus according to certain embodiment(s) of the present disclosure.

In one embodiment, referring to FIG. 7, the first content-based matching unit 304 may include:
- a preference determining subunit 3041, which may be configured to determine preference information of the object for the push content based on the historical behavior feature data; and
- a first content-based matching subunit 3042, which may be configured to perform content-based matching for the push content set based on the preference information to obtain the target push content set of the object.

In one embodiment, the first content-based matching subunit 3042 may be configured to:
determine an object group to which the object belongs based on the preference information; select push contents associated with the object group from the push content set; sort the selected push contents to obtain sorted push contents; and perform content-based matching for the sorted push contents based on a result of the sorting to obtain the target push content set of the object.

In one embodiment, the first content-based matching subunit 3042 may be configured to:
obtain content description information of the push content; perform content preference matching between the object and the push content based on the preference information and the content description information; and perform content-based matching for the push content set based on a result of the matching to obtain the target push content set of the object.

Figure 8:
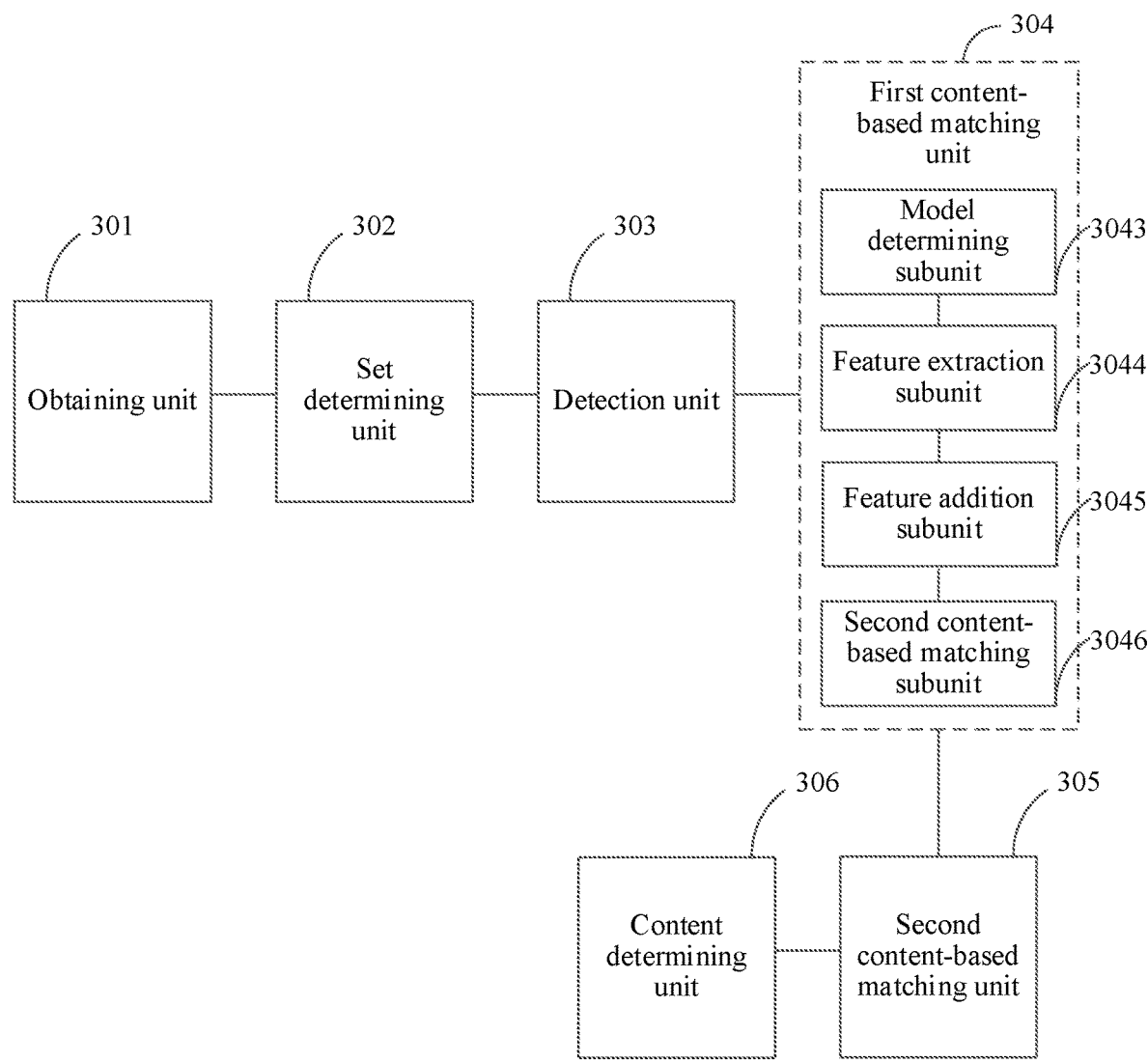
FIG. 8 is a schematic structural diagram of a push content processing apparatus according to certain embodiment(s) of the present disclosure.

In one embodiment, referring to FIG. 8, the first content-based matching unit 304 may include:
- a model determining subunit 3043, which may be configured to determine an original push evaluation model for the push content;
- a feature extraction subunit 3044, which may be configured to perform feature extraction of the historical behavior feature data to obtain a content interaction feature of the object for the push content;
- a feature addition subunit 3045, which may be configured to add the content interaction feature to the original push evaluation model so that the push evaluation model after the addition determines a content push evaluation result of the push content for the object by referring to the content interaction feature; and
- a second content-based matching subunit 3046, which may be configured to perform content-based matching for the push content set based on the content push evaluation result to obtain the target push content set of the object.

Figure 9:
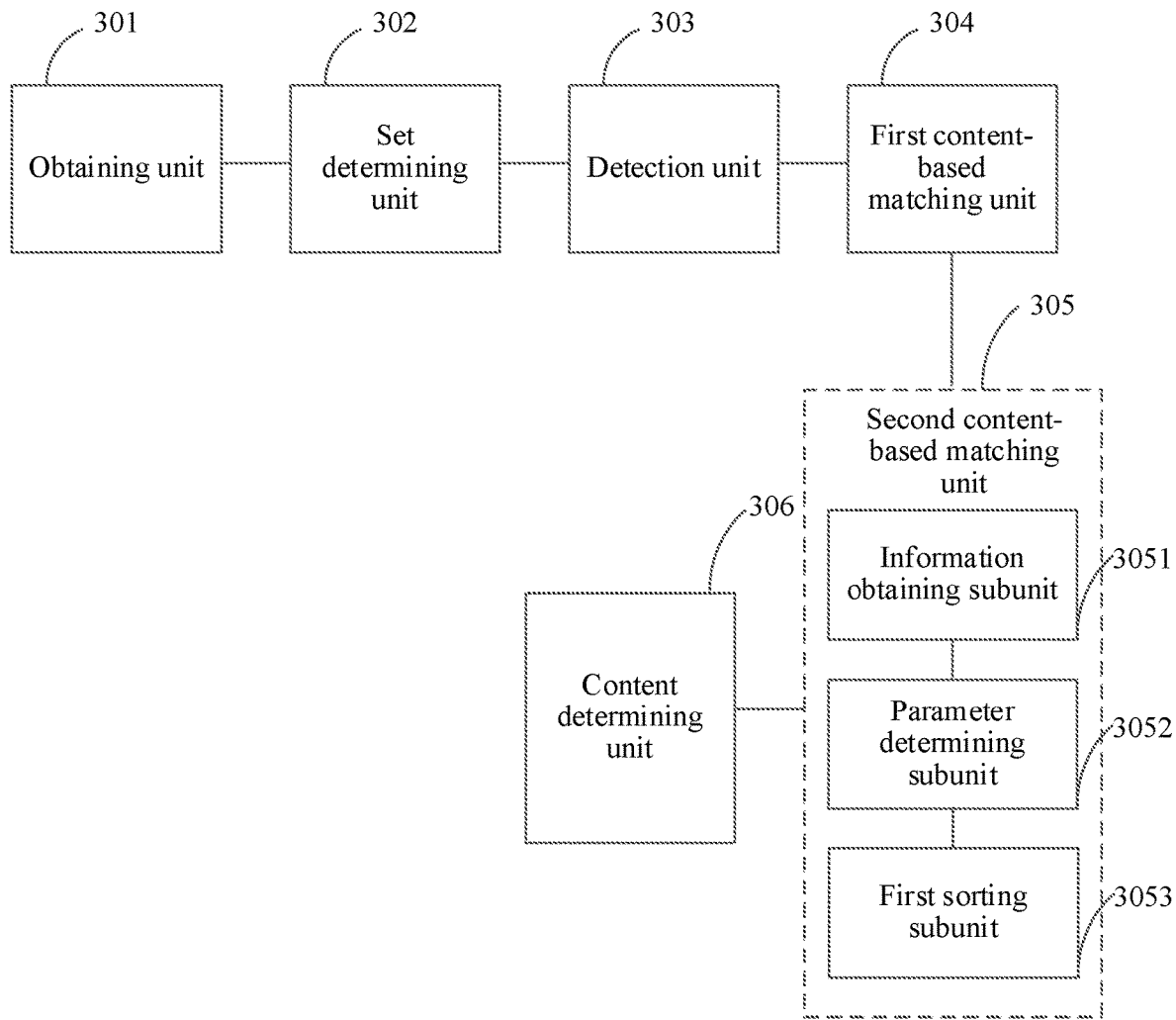
FIG. 9 is a schematic structural diagram of a push content processing apparatus according to certain embodiment(s) of the present disclosure.

In one embodiment, referring to FIG. 9, the second content-based matching unit 305 may include:
- an information obtaining subunit 3051, which may be configured to obtain push statistics information of the push content and preference information of the object for the push content;
- a parameter determining subunit 3052, which may be configured to determine a content push evaluation parameter for the push content based on the push statistics information and the preference information; and
- a first sorting subunit 3053, which may be configured to perform content sorting of the push content set based on the content push evaluation parameter and perform content-based matching of the push content of the object to obtain the target push content set of the object.

In one embodiment, the first sorting subunit 3053 may be configured to:
determine an original push evaluation model for the push content; add the content push evaluation parameter to the original push evaluation model so that the push evaluation model after the addition determines a content push evaluation result of the push content for the object based on the content push evaluation parameter; perform content sorting of the push content set based on the content push evaluation result; and determine the push content of the object based on a result of the sorting, to obtain the target push content set of the object.

Figure 10:
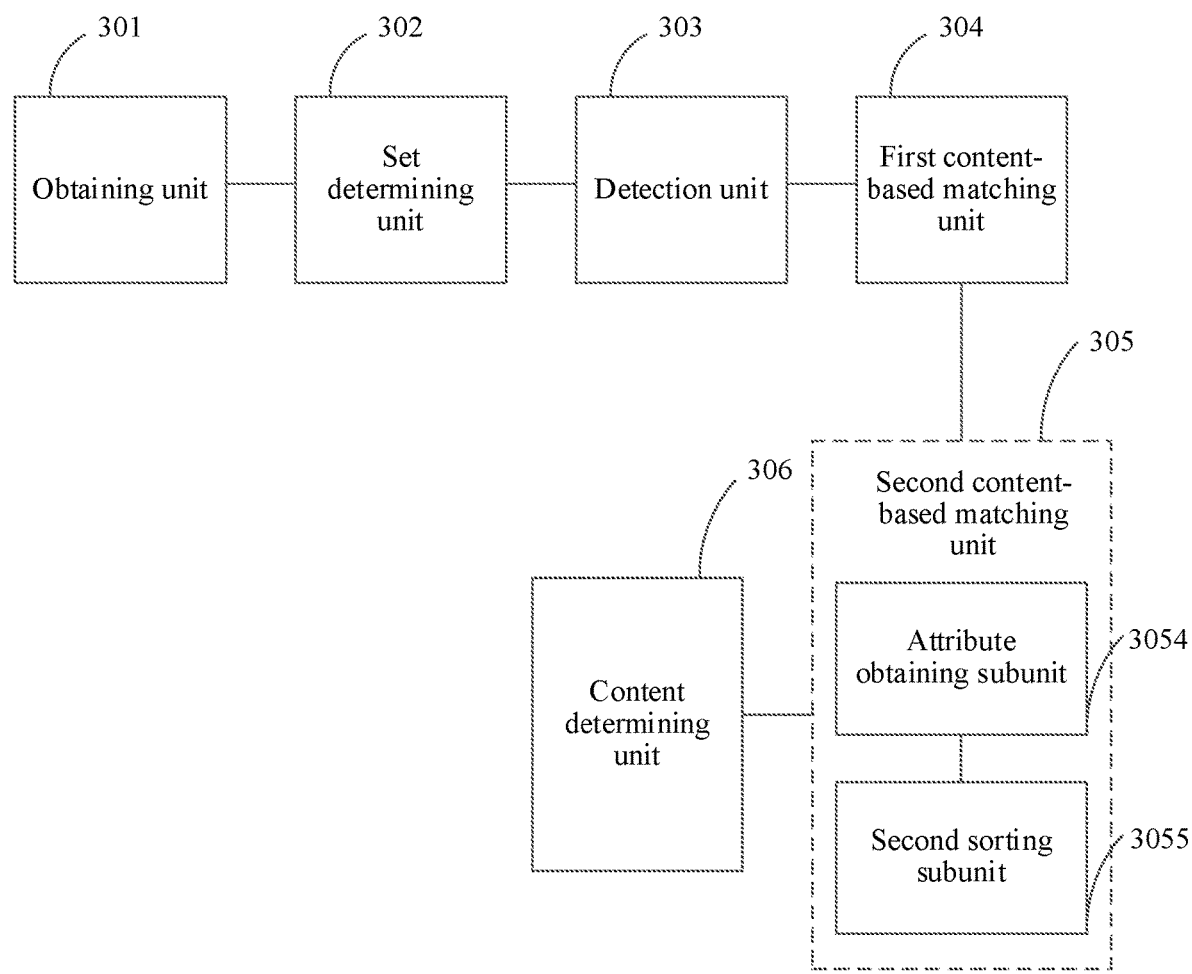
FIG. 10 is a schematic structural diagram of a push content processing apparatus according to certain embodiment(s) of the present disclosure.

In one embodiment, referring to FIG. 10, the second content-based matching unit 305 may include:
- an attribute obtaining subunit 3054, which may be configured to obtain content attribute information of the push content and object attribute information of the object for the push content; and
- a second sorting subunit 3055, which may be configured to perform content sorting of the push content set based on the content attribute information and the object attribute information and perform content-based matching of the push content of the object to obtain the target push content set of the object.

In one embodiment, the second sorting subunit 3055 may be configured to:
select push contents to be sorted from the push content set based on the content attribute information and the object attribute information; sort the push contents to be sorted to obtain sorted push contents; and determine the push content of the object from the sorted push contents based on a result of the sorting, to obtain the target push content set of the object.

Figure 11:
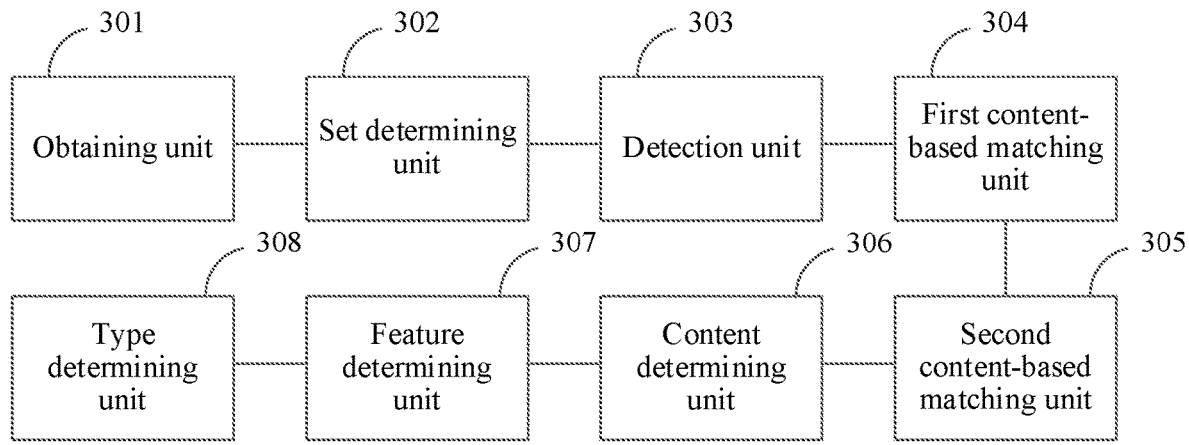
FIG. 11 is a schematic structural diagram of a push content processing apparatus according to certain embodiment(s) of the present disclosure.

In an embodiment, referring to FIG. 11, the push content processing apparatus further includes:

a feature determining unit 307, which may be configured to determine a target behavior feature of the object for the target push content; and a type determining unit 308, which may be configured to determine an object type of the object for the push content according to the target behavior feature and the preset negative behavior condition.

During implementation, the units may be implemented as independent entities, or may be randomly combined, or may be implemented as a same entity or several entities. For implementation of the units, refer to the method embodiments. Details are not described herein again.

Figure 12:
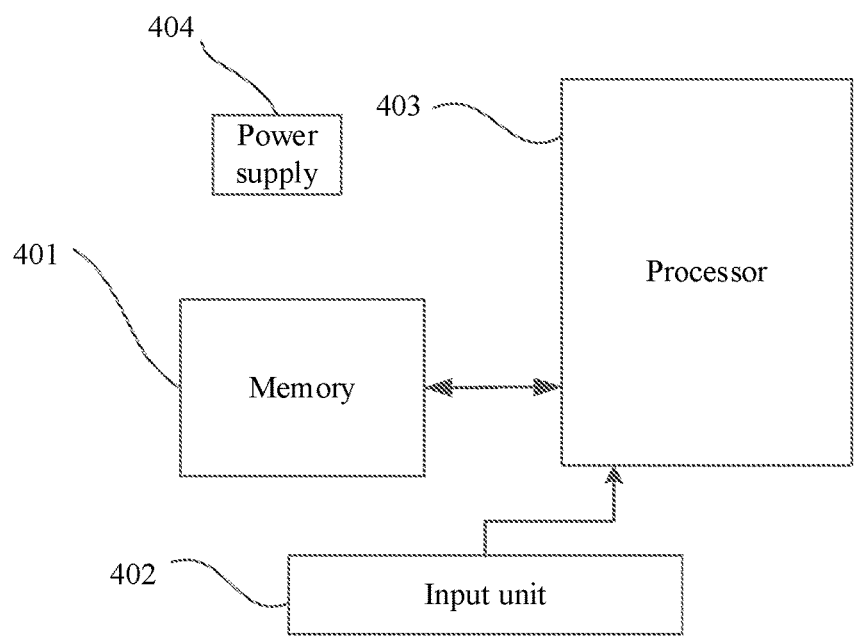
FIG. 12 is a schematic structural diagram of a computing device according to certain embodiment(s) of the present disclosure.

In addition, an embodiment of the present disclosure further provides a computing device. The computing device may be a server, a terminal, etc. FIG. 12 is a schematic structural diagram of a computing device according to an embodiment of the present disclosure. Details are as follows:

The computing device may include a memory 401 including components such as one or more computer-readable storage media, an input unit 402, a processor 403 including one or more processing cores, and a power supply 404. A person skilled in the art may understand that, the structure of the computing device shown in FIG. 12 does not constitute a limitation on the computing device, and may include components that are more or fewer than those shown in the figure, or a combination of some components, or different component arrangements.

Though not shown in the figure, the computing device 500 may further include a camera, a Bluetooth module, etc., which will not be detailed herein. In certain embodiment(s), in this embodiment, the processor 403 in the computing device loads an executable file corresponding to one or more processes of an application program into the memory 401, and the processor 403 runs the application program stored in the memory 401 to realize various functions of the computing device, for example, implement any content processing method provided in the embodiments of the present disclosure.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit may be implemented using one or more processors (or processors and memory). Likewise, a processor (or processors and memory) may be used to implement one or more units. Moreover, each unit may be part of an overall unit that includes the functionalities of the unit.

For implementations of the operations, refer to the embodiments. Details are not described herein again.

A person of ordinary skill in the art may understand that, all or some operations of the methods in the embodiments may be implemented by using instructions, or implemented through instructions controlling relevant hardware, and the instructions may be stored in a computer-readable memory and loaded and executed by a processor.

Accordingly, an embodiment of the present disclosure provides a storage medium, storing a plurality of instructions, the instructions being configured to be loaded by a processor, to perform the operations in any content processing method according to the embodiments of the present disclosure.

For implementations of the operations, refer to the embodiments. Details are not described herein again.

Since the instructions stored in the storage medium may perform the operations of any content processing method in the embodiments of the present disclosure, the instructions may achieve the beneficial effects that may be achieved by any content processing method in the embodiments of the present disclosure. Refer to the embodiments may for details, which will not be repeated herein.

According to an aspect of the present disclosure, a computer program product or a computer program is provided. The computer program product or the computer program includes computer instructions, the computer instructions being stored in a computer-readable storage medium. A processor of a computing device reads the computer instructions from the computer-readable storage medium, and executes the computer instructions, so that the computing device performs the content processing method provided in the implementations of the aspects described above.

The content processing method and apparatus, computing device, and storage medium provided in the embodiments of the present disclosure are described in detail. Although the principles and implementations of the present disclosure are described by using examples in the present disclosure, the descriptions of the embodiments are merely intended to help understand the method and the core idea of the method of the present disclosure. In addition, a person skilled in the art may make modifications to the implementations and application scopes according to the ideas of the present disclosure. The content of the present disclosure should not be construed as a limitation to the present disclosure.

What is claimed is:

1. A content processing method, executed by a computing device, the method comprising:
    obtaining a push content request from an object;
    determining a push content set according to the push content request, the push content set including at least one push content;
    detecting historical behavior feature data of the object for a push content in response to a behavior feature of the object for the push content satisfying a preset negative behavior condition;
    performing content-based matching for the push content set based on the historical behavior feature data to obtain a target push content set of the object, in response to the object having the historical behavior feature data;
    performing content sorting of the push content set and performing content-based matching of the push content of the object to obtain a target push content set of the object, in response to the object not having the historical behavior feature data; and
    determining a target push content of the object from the target push content set, and transmitting the target push content to the object.

2. The method according to claim 1, wherein detecting the historical behavior feature data of the object comprises:
    obtaining behavior information of the object for the push content;
    statistically analyzing the behavior information to obtain the behavior feature of the object for the push content; and detecting the historical behavior feature data of the object for the push content in response to the behavior feature satisfying the preset negative behavior condition.

3. The method according to claim 2, wherein obtaining the behavior information of the object comprises:
adjusting a content push evaluation threshold in a content push system;
transmitting the push content to the object based on the adjusted content push evaluation threshold; and
obtaining the behavior information of the object for the push content in a present time range.

4. The method according to claim 1, wherein performing the content-based matching for the push content set comprises:
determining preference information of the object for the push content based on the historical behavior feature data; and
performing content-based matching for the push content set based on the preference information to obtain the target push content set of the object.

5. The method according to claim 4, wherein performing the content-based matching for the push content set comprises:
determining an object group to which the object belongs based on the preference information;
selecting push contents associated with the object group from the push content set;
sorting the selected push contents to obtain sorted push contents; and
performing content-based matching for the sorted push contents based on a result of the sorting to obtain the target push content set of the object.

6. The method according to claim 4, wherein performing the content-based matching for the push content set comprises:
obtaining content description information of the push content;
performing content preference matching between the object and the push content based on the preference information and the content description information; and
performing content-based matching for the push content set based on a result of the matching to obtain the target push content set of the object.

7. The method according to claim 1, wherein performing the content-based matching for the push content set comprises:
determining an original push evaluation model for the push content;
performing feature extraction of the historical behavior feature data to obtain a content interaction feature of the object for the push content;
adding the content interaction feature to the original push evaluation model so that the push evaluation model after the addition determines a content push evaluation result of the push content for the object by referring to the content interaction feature; and
performing content-based matching for the push content set based on the content push evaluation result to obtain the target push content set of the object.

8. The method according to claim 1, wherein performing the content sorting of the push content set comprises:
obtaining push statistics information of the push content and preference information of the object for the push content;
determining a content push evaluation parameter for the push content based on the push statistics information and the preference information; and
performing content sorting of the push content set based on the content push evaluation parameter and performing content-based matching of the push content of the object to obtain the target push content set of the object.

9. The method according to claim 8, wherein performing the content sorting of the push content set comprises:
determining an original push evaluation model for the push content;
adding the content push evaluation parameter to the original push evaluation model so that the push evaluation model after the addition determines a content push evaluation result of the push content for the object based on the content push evaluation parameter;
performing content sorting of the push content set based on the content push evaluation result; and
determining the push content of the object based on a result of the sorting, to obtain the target push content set of the object.

10. The method according to claim 1, wherein performing the content sorting of the push content set comprises:
obtaining content attribute information of the push content and object attribute information of the object for the push content; and
performing content sorting of the push content set based on the content attribute information and the object attribute information and performing content-based matching of the push content of the object to obtain the target push content set of the object.

11. The method according to claim 10, wherein performing the content sorting of the push content set comprises:
selecting push contents to be sorted from the push content set based on the content attribute information and the object attribute information;
sorting the push contents to be sorted to obtain sorted push contents; and
determining the push content of the object from the sorted push contents based on a result of the sorting, to obtain the target push content set of the object.

12. The method according to claim 1, further comprising:
determining a target behavior feature of the object for the target push content; and
determining an object type of the object for the push content according to the target behavior feature and the preset negative behavior condition, the object type of the object for the push content indicating whether the object is interested in the push content.

13. A content processing apparatus, comprising: a memory storing computer program instructions; and a processor coupled to the memory and configured to execute the computer program instructions and perform:
obtaining a push content request from an object;
determining a push content set according to the push content request, the push content set including at least one push content;
detecting historical behavior feature data of the object for a push content in response to a behavior feature of the object for the push content satisfying a preset negative behavior condition;
performing content-based matching for the push content set based on the historical behavior feature data to obtain a target push content set of the object, in response to the object having the historical behavior feature data;

performing content sorting of the push content set and performing content-based matching of the push content of the object to obtain a target push content set of the object, in response to the object not having the historical behavior feature data; and determining a target push content of the object from the target push content set, and transmitting the target push content to the object.

14. The content processing apparatus according to claim 13, wherein detecting the historical behavior feature data of the object includes:

obtaining behavior information of the object for the push content;

statistically analyzing the behavior information to obtain the behavior feature of the object for the push content; and detecting the historical behavior feature data of the object for the push content in response to the behavior feature satisfying the preset negative behavior condition.

15. The content processing apparatus according to claim 14, wherein obtaining the behavior information of the object includes:

adjusting a content push evaluation threshold in a content push system;

transmitting the push content to the object based on the adjusted content push evaluation threshold; and obtaining the behavior information of the object for the push content in a present time range.

16. The content processing apparatus according to claim 13, wherein performing the content-based matching for the push content set comprises:

determining preference information of the object for the push content based on the historical behavior feature data; and performing content-based matching for the push content set based on the preference information to obtain the target push content set of the object.

17. The content processing apparatus according to claim 16, wherein performing the content-based matching for the push content set includes:

determining an object group to which the object belongs based on the preference information;

selecting push contents associated with the object group from the push content set;

sorting the selected push contents to obtain sorted push contents; and performing content-based matching for the sorted push contents based on a result of the sorting to obtain the target push content set of the object.

18. The content processing apparatus according to claim 16, wherein performing the content-based matching for the push content set includes:

obtaining content description information of the push content;

performing content preference matching between the object and the push content based on the preference information and the content description information; and performing content-based matching for the push content set based on a result of the matching to obtain the target push content set of the object.

19. The content processing apparatus according to claim 13, wherein performing the content-based matching for the push content set includes:

determining an original push evaluation model for the push content;

performing feature extraction of the historical behavior feature data to obtain a content interaction feature of the object for the push content;

adding the content interaction feature to the original push evaluation model so that the push evaluation model after the addition determines a content push evaluation result of the push content for the object by referring to the content interaction feature; and performing content-based matching for the push content set based on the content push evaluation result to obtain the target push content set of the object.

20. A non-transitory computer-readable storage medium storing computer program instructions executable by at least one processor to perform:

obtaining a push content request from an object;

determining a push content set according to the push content request, the push content set including at least one push content;

detecting historical behavior feature data of the object for a push content in response to a behavior feature of the object for the push content satisfying a preset negative behavior condition;

performing content-based matching for the push content set based on the historical behavior feature data to obtain a target push content set of the object, in response to the object having the historical behavior feature data;

performing content sorting of the push content set and performing content-based matching of the push content of the object to obtain a target push content set of the object, in response to the object not having the historical behavior feature data; and determining a target push content of the object from the target push content set, and transmitting the target push content to the object.

* * * * *